United States Patent
Szeliski

(10) Patent No.: US 6,487,304 B1
(45) Date of Patent: Nov. 26, 2002

(54) MULTI-VIEW APPROACH TO MOTION AND STEREO

(75) Inventor: Richard S. Szeliski, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/334,857

(22) Filed: Jun. 16, 1999

(51) Int. Cl.[7] .................................................. G06K 9/00
(52) U.S. Cl. ........................................ 382/107; 382/167
(58) Field of Search ................................ 382/167, 294, 382/154, 107, 284; 345/419, 502; 725/34

(56) References Cited

PUBLICATIONS

B. Günsel, A. M. Tekalp, P. J. L. Van Beek. Content–Based Access to Video Objects: Temporal Segmentation, Visual Summarization, and Feature Extraction. In Signal Processing, vol. 66, No. 2, pp. 261–280, Elsevier Science B. V., 1998.

S. Baker, R. Szeliski, and P. Anandan. A layered approach to stereo reconstruction. In CVPR'98, pp. 434–441, Santa Barbara, Jun. 1998.

J. R. Bergen, P. Anandan, K. J. Hanna, and R. Hingorani. Hierarchical model–based motion estimation, In ECCV'92, pp. 237–252, Santa Margherita, May 1992.

M. J. Black and A. D. Jepson. Estimating optical flow in segmented images using variable–order parametric models with local deformations. IEEE Trans. Patt. Anal. Mach. Intell., 18(10):972–986, Oct. 1996.

M. J. Black and A. Rangarajan. On the unification of line processes, outlier rejection, and robust statistics with applications in early vision. Intl. J. Comp. Vision, 19(1):57–91, 1996.

R. T. Collins. A space–sweep approach to true multi–image matching. In CVPR'96, pp. 358–363, San Francisco, Jun. 1996.

P. E. Debevec, C. J. Taylor, and J. Malik. Modeling and rendering architecture from photographs: A hybrid geometry–and image–based approach. Computer Graphics (SIGGRAPH'96), pp. 11–20, Aug. 1996.

(List continued on next page.)

*Primary Examiner*—Andrew W. Johns
*Assistant Examiner*—Seyed Azarian
(74) *Attorney, Agent, or Firm*—Lyon & Harr, LLP; Richard T. Lyon

(57) ABSTRACT

A system and process for computing motion or depth estimates from multiple images. In general terms this is accomplished by associating a depth or motion map with each input image (or some subset of the images equal or greater than two), rather that computing a single map for all the images. In addition, consistency between the estimates associated with different images is ensured. More particularly, this involves minimizing a three-part cost function, which consists of an intensity (or color) compatibility constraint, a motion/depth compatibility constraint, and a flow smoothness constraint. In addition, a visibility term is added to the intensity (or color) compatibility and motion/depth compatibility constraints to prevent the matching of pixels into areas that are occluded. In operation, the cost function is computed in two phases. During an initializing phase, the motion or depth for each image being examined are estimated independently. Since there are not yet any estimates for other frames to employ in the calculation, the motion or depth compatibility term is ignored. In addition, no visibilities are computed and it is assumed all pixels are visible. Once an initial set of motion estimates have been computed, the visibilities are computed and the motion or depth estimates recalculated using the visibility terms and the motion or depth compatibility constraint. The foregoing process can then be repeated several times using the revised estimates from the previous iteration as the initializing estimates for the new iteration, to obtain better estimates of motion/depth values and visibility.

105 Claims, 12 Drawing Sheets

OTHER PUBLICATIONS

S. J. Gortler, R. Grzeszczuk, R. Szeliski, and M. F. Cohen. The lumigraph. In Computer Graphics (SIGGRAPH) pp. 43–54, Aug. 1996.

B. K. P. Horn and B. G. Schunck. Determining optical flow. Artificial Intelligence, 17:185–203, 1981.

S. S. Intille and A. F. Bobick. Disparity–space images and large occlusion stereo. In ECCV'94, Stockholm, Sweden, May 1994.Springer–Verlag.

T. Kanade and M. Okutomi. A stereo matching algorithm with an adaptive window: Theory and experiment. IEEE Trans. Patt. Anal. Mach. Intell., 16(9):920–932, Sep. 1994.

D. Le Gall. MPEG: A video compression standard for multimedia applications. CACM, 34(4):44–58, Apr. 1991.

B. D. Lucas and T. Kanade. A interative image registration technique with application in stereo vision. In IJCAI–81, pp. 674–679, Vancouver, 1981.

L. H. Matthies, R. Szeliski, and T. Kanade. Kalman filter–based algorithms for estimating depth from image sequences. Intl. J. Comp. Vision, 3:209–236, 1989.

D. Scharstein and R. Szeliski. Stereo matching with nonlinear diffusion. Intl. J. Comp. Vision, 28(2):155–174, Jul. 1998.

S. M. Seitz and C. M. Dyer. Photorealistic scene reconstruction by space coloring. In CVPR'91, pp. 1067–1073, San Juan, PuertoRico, Jun. 1997.

J. Shade, S. Gortler, L.–W. He, and R. Szeliski. Layered depth images. In Computer Graphics (SIGGRAPH'98) Proceedings, pp. 231–242, Orlando, Jul. 1998.

R. Szeliski and J. Coughlan. Hierarchical spline–based image registration. Intl. J. Comp. Vision, 22(3):199–218, Mar./Apr. 1997.

R. Szeliski and P. Golland. Stereo matching with transparency and matting. In ICCV'98, pp. 517–524, Bombay, Jan. 1998.

J. Y. A. Wang and E. H. Adelson. Layered representation for motion anaysis. In CVPR'93, pp. 361–366, New York, New York, Jun. 1993.

Y. Weiss. Smoothness in layers: Motion segmentation using nonparametric mixture estimation. In CVPR'97, pp. 520–526, San Juan, Puerto Rico, Jun. 1997.

P. Fua. A parallel stereo algorithm that produces dense depth maps and preserves image features. Machine Vision and Application, 6:35–49, 1993.

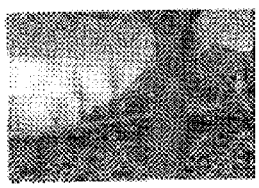 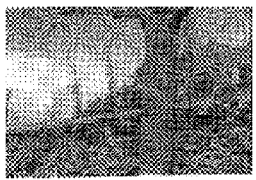 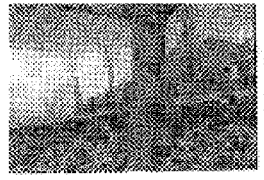 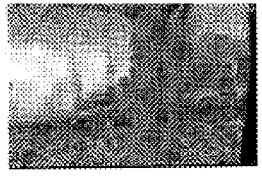
FIG. 8(a)   FIG. 8(b)   FIG. 8(c)   FIG. 8(d)
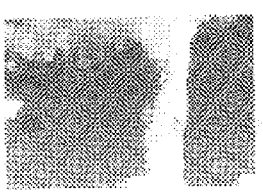 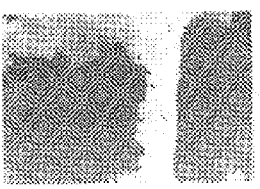 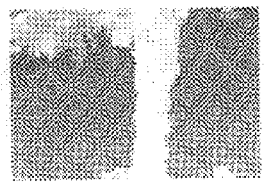 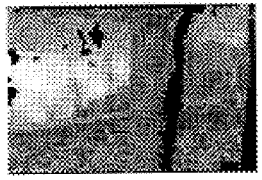
FIG. 8(e)   FIG. 8(f)   FIG. 8(g)   FIG. 8(h)
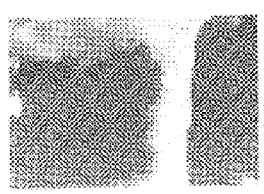 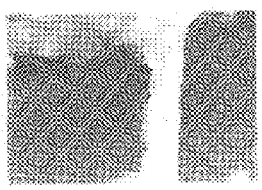 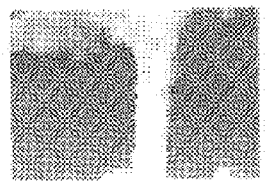 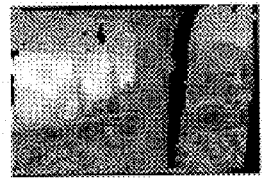
FIG. 8(i)   FIG. 8(j)   FIG. 8(k)   FIG. 8(l)
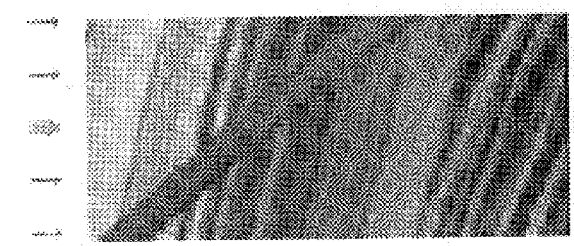
FIG. 1

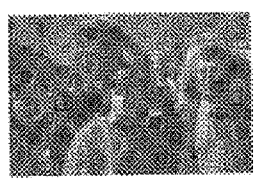 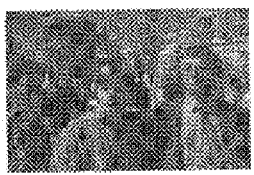 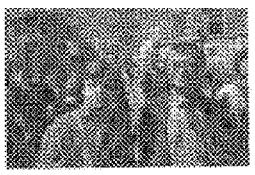 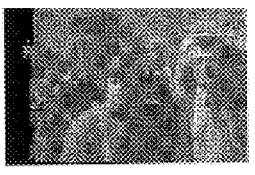
FIG. 9(a)    FIG. 9(b)    FIG. 9(c)    FIG. 9(d)
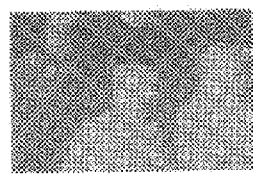 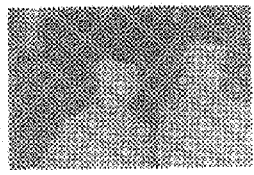 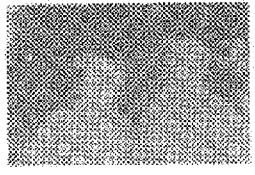 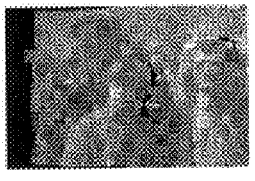
FIG. 9(e)    FIG. 9(f)    FIG. 9(g)    FIG. 9(h)
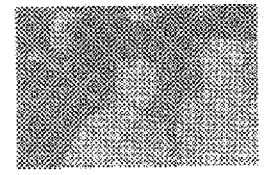 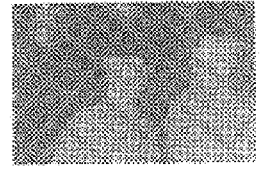 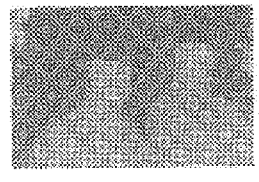 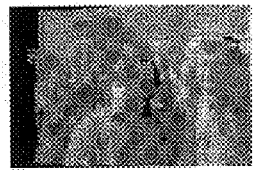
FIG. 9(i)    FIG. 9(j)    FIG. 9(k)    FIG. 9(l)

MULTI-VIEW APPROACH TO MOTION AND STEREO

BACKGROUND

1. Technical Field:

The invention is related to a computer-implemented system and process for estimating a motion or depth map for multiple images of a 3D scene, and more particularly, to a system and process for estimating motion or depth maps for more than one image of the multiple images of the 3D scene.

2. Background Art:

Stereo and motion have long been central research problems in computer vision. Early work was motivated by the desire to recover depth maps and coarse shape and motion models for robotics and object recognition applications. More recently, depth maps obtained from stereo (or alternately dense correspondence maps obtained from motion) have been combined with texture maps extracted from input images in order to create realistic 3-D scenes and environments for virtual reality and virtual studio applications. Similarly, these maps have been employed for motion-compensated prediction in video processing applications. Unfortunately, the quality and resolution of most of today's algorithms falls quite short of that demanded by these new applications, where even isolated errors in correspondence become readily visible when composited with synthetic graphical elements.

One of the most common errors made by these algorithms is a mis-estimation of depth or motion near occlusion boundaries. Traditional correspondence algorithms assume that every pixel has a corresponding pixel in all other images. Obviously, in occluded regions, this is not so. Furthermore, if only a single depth or motion map is used, it is impossible to predict the appearance of the scene in regions which are occluded. This point is illustrated in FIG. 1. FIG. 1 depicts a slice through a motion sequence spatio-temporal volume. A standard estimation algorithm only estimates the motion at the center frame designated by the ($\Leftrightarrow$) symbol, and ignores other frames such as those designated by the ($\rightarrow$) symbols. As can be seen some pixels that are occluded in the center frame are visible in some of the other frames. Other problems with traditional approaches include dealing with untextured or regularly textured regions, and with viewpoint-dependent effects such as specularities or shading.

One popular approach to tackling these problems is to build a 3D volumetric model of the scene [15, 18]. The scene volume is discretized, often in terms of equal increments of disparity. The goal is then to find the voxels which lie on the surfaces of the objects in the scene. The benefits of such an approach include the equal and efficient treatment of a large number of images [5], the possibility of modeling occlusions [9], and the detection of mixed pixels at occlusion boundaries [18]. Unfortunately, discretizing space volumetrically introduces a large number of degrees of freedom and leads to sampling and aliasing artifacts. To prevent a systematic "fattening" of depth layers near occlusion boundaries, variable window sizes [10] or iterative evidence aggregation [14] can be used. Sub-pixel disparities can be estimated by finding the analytic minimum of the local error surface [13] or using gradient-based techniques [12], but this requires going back to a single depth/motion map representation.

Another active area of research is the detection of parametric motions within image sequences [19, 3, 20]. Here, the goal is to decompose the images into sub-images, commonly referred to as layers, such that the pixels within each layer move with a parametric transformation. For rigid scenes, the layers can be interpreted as planes in 3D being viewed by a moving camera, which results in fewer unknowns. This representation facilitates reasoning about occlusions, permits the computation of accurate out-of-plane displacements, and enables the modeling of mixed or transparent pixels [1]. Unfortunately, initializing such an algorithm and determining the appropriate number of layers is not straightforward, and may require sophisticated optimization algorithms to resolve.

Thus, all current correspondence algorithms have their limitations. Single depth or motion maps cannot represent occluded regions not visible in the reference image and usually have problems matching near discontinuities. Volumetric techniques have an excessively large number of degrees of freedom and have limited resolution, which can lead to sampling or aliasing artifacts. Layered motion and stereo algorithms require combinatorial search to determine the correct number of layers and cannot naturally handle true three-dimensional objects (they are better at representing "cutout" scenes). Furthermore, none of these approaches can easily model the variation of scene or object appearance with respect to the viewing position.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [15, 18]. A listing of the publications corresponding to each designator can be found at the end of the Detailed Description section.

SUMMARY

The present invention relates to a new approach to computing dense motion or depth estimates from multiple images that overcomes the problems of current depth and motion estimation methods. In general terms this is accomplished by associating a depth or motion map with each input image (or some subset of the images equal to or greater than two), rather that computing a single map for all the images. In addition, consistency between the estimates associated with different images is ensured by using a motion compatibility constraint and reasoning about occlusion relationships by computing pixel visibilities. This system of cross-checking estimates between images produces richer, more accurate, estimates for the desired motion and depth maps.

More particularly, a preferred process according to the present invention involves using a multi-view framework that generates dense depth or motion estimates for the input images (or a subset thereof). This is accomplished by minimizing a three-part cost function, which consists of an intensity compatibility constraint, a motion or depth compatibility constraint, and a motion smoothness constraint. The motion smoothness term uses the presence of color/brightness discontinuities to modify the probability of motion smoothness violations. In addition, a visibility term is added to the intensity compatibility and motion/depth compatibility constraints to prevent the matching of pixels into areas that are occluded. In operation, the cost function is computed in two phases. During an initializing phase, the motion or depth values for each image being examined are estimated independently. Since there is not yet any motion/depth estimates for other frames to employ in the calculation, the motion/depth compatibility term is ignored. In addition, no visibilities are computed and it is assumed all pixels are visible. Once an initial set of motion/depth estimates have been computed, the visibilities are computed and the motion/depth estimates recalculated using the visibility terms and the motion/depth compatibility constraint. The foregoing process can then be repeated several times using the revised motion/depth estimates from the previous iteration as the initializing estimates for the new iteration, to obtain better estimates of motion/depth and visibility.

The foregoing new approach is motivated by several target applications. One application is view interpolation, where it is desired to generate novel views from a collection of images with associated depth maps. The use of multiple depth maps and images allows modeling partially occluded regions and to model view-dependent effects (such as specularities) by blending images taken from nearby viewpoints [6]. Another application is motion-compensated frame interpolation (e.g., for video compression, rate conversion, or de-interlacing), where the ability to predict bi-directionally (from both previous and future keyframes) yield better prediction results [11]. A third application is as a low-level representation from which segmentation and layer extraction (or 3D model construction) can take place.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing (s) will be provided by the U.S. Patatent and Trademark Office upon request and payment of the necessary fee.

The specific features, aspects, and advantages of the present invention will become better understood with regard to the following description, appended claims, and accompanying drawings where:

FIG. 1 is an image depicting a slice through a motion sequence spatio-temporal volume.

FIGS. 8(a)–(l) are images depicting the results of various stages of the overall process of FIG. 3 as applied to a scene of a flower garden.

FIGS. 9(a)–(l) are images depicting the results of various stages of the overall process of FIG. 3 as applied to a scene of a computer graphics symposium.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 2:
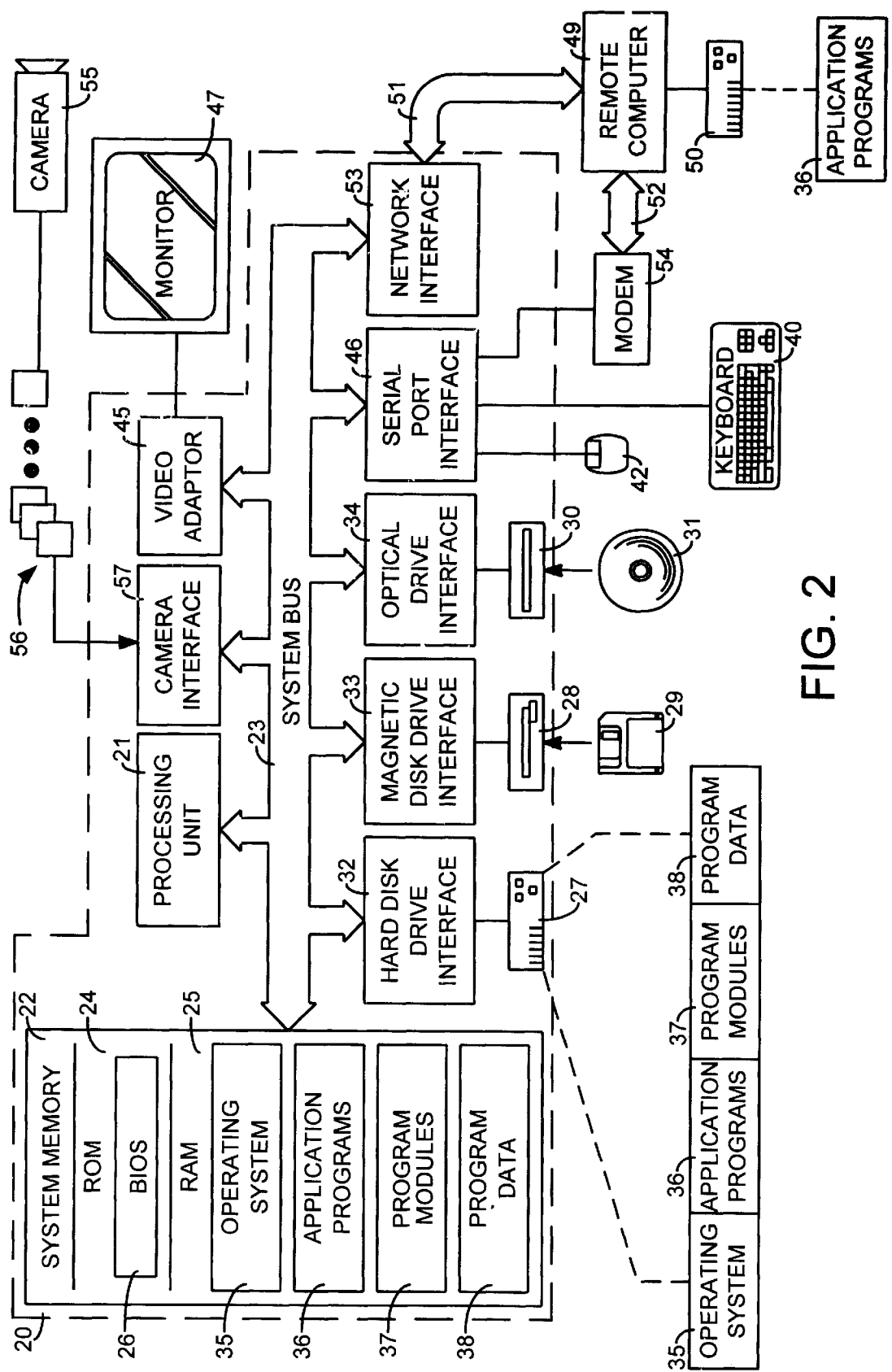
FIG. 2 is a diagram depicting a general purpose computing device constituting an exemplary system for implementing the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53.

When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the invention and the testing of these modules.

1. The multi-view Framework

As mentioned previously, the multi-view framework associated with the present invention is motivated by several requirements. These include the ability to accurately predict the appearance of novel views or in-between images and the ability to extract higher-level representations such as layered models or surface-based models. This is essentially accomplished by estimating a collection of motion or depth fields associated with multiple images, such that the aforementioned other views and images can be predicted based on the estimates.

Assume a given collection of images $\{I_t(x_t)\}$, where $I_t$ is the image at time or location t, and $x_t=(x_t, y_t)$ indexes pixels in image $I_t$. A simple way to formulate a multi-view matching criterion is $$C(\{u_s\}) = \sum_s \sum_{t \in N(s)} w_{st} \sum_{x_s} \rho(I_s(x_s) - I_t(x_t)). \tag{1}$$

The images $I_s$ are considered the keyframes (or key-views) for which a motion or depth estimate (either of which will be identified by the variable $u_s(x_s)$) will be computed. It is noted that throughout this description the term motion/depth may be used as a short version of the phrase motion or depth.

The decision as to which images are keyframes is problem-voxel dependent, much like the selection of I and P frames in video compression [11]. For 3D view interpolation, one possible choice of keyframes would be a collection of characteristic views.

Images $I_t$, $t \in N(s)$ are neighboring frames (or views), for which the corresponding pixel intensities (or colors) should agree. The pixel coordinate $x_t$ corresponding to a given keyframe pixel $x_s$ with motion/depth $u_s$ can be computed according to a chosen motion model (Section 1.1). The constants $w_{st}$ are the inter-frame weights which dictate how much neighboring frame t will contribute to the estimate of $u_s$. Note that $w_{st}$ could be set to zero (0) for $t \notin N(s)$ and the $t \in N(s)$ notation could be abandoned.

Corresponding pixel intensity or color differences are passed through a robust penalty function $\rho$, which is discussed in more detail in Section 1.2. In the case of color images, each color channel can be passed separately through the robust penalty function. However, a better approach would be to compute a reasonable color-space distance between pixels, and pass this through a robust penalty, since typically either all bands are affected by circumstances such as occlusions or specularities, or none of them are affected.

1.1 Motion Models

Given the basic matching criterion, a variety of motion models can be used, depending on the imaging/acquisition setup and the problem at hand. Bergen et al. [2] present a variety of instantaneous (infinitessimal) motion models in a unified estimation framework. Szeliski and Coughlan [17] present a similar set of motion models for finite (larger) motion. In the proposed process according to the present invention, two motion models are considered: constant flow (uniform velocity), and rigid body motion.

The constant flow motion model assumes a (locally) constant velocity, $$x_t = x_s + (t-s)u_s(x_s) \tag{2}$$

This model is appropriate when processing regular video with a relatively small sliding window of analysis. It should also be noted that this model does not require constant flow throughout the whole video. Rather, it assumes that within the window $t \in N(s)$, the constant flow model is a reasonably good approximation to the true velocity.

The rigid motion model assumes that the camera is moving in a rigid scene or observing a single rigid moving object, but does not assume a uniform temporal sampling rate. In this model, $$x_t = P(M_{ts}x_s + e_{ts}d_s(x_s)) \quad (3)$$

where $M_{ts}$, is a nomography describing a global parametric motion, $d_s(x_s)$ is a per-pixel displacement that adds some motion towards the epipole $e_{ts}$ and $P(x, y, z)=(x/z, y/z)$ is the perspective projection operator. In the remainder of this description, the notation us will be used to indicate the unknown per-pixel motion parameter, even when it is actually a scalar displacement $d_s$.

For a calibrated camera, with intrinsic viewing matrix $V_t$, we have $M_{ts}=V_tR_tR_s^{-1}V_s-1$ and $e_{ts}=V_tR_t(c_s-c_t)$, where $R_t$ is the camera's orientation and $c_t$ is its position in space. In this case, $M_{ts}$ is the homography corresponding to the plane at infinity. If all of the cameras live in the same plane with their optical axes perpendicular to the plane, $d_s$ is the inverse depth (sometimes called the disparity [10]) of a pixel. It is possible to estimate $\{M_{ts}, e_{ts}\}$ at the same time as $d_s(x_s)$ [17], or these global parameters can be estimated ahead of time by tracking some feature points and doing a projective reconstruction of the camera ego-motion.

1.2 Robust Penalty Functions

In order to account for outliers among the pixel correspondences (e.g., because pixels might be occluded in some images), a robust matching criterion is preferably employed. Black and Rangarajan [4] provide a nice survey of robust statistics applied to image matching and image segmentation problems.

In the proposed process, a contaminated Gaussian distribution, which is a mixture of a Gaussian distribution and a uniform distribution is preferred. The probability function for this distribution is $$p(x;\sigma, \epsilon) = Z^{-1}[(1-\epsilon) \exp(-x^2/(2\sigma^2)) + \epsilon]. \quad (4)$$

where $\Omega$ in the standard deviation of the inlier process, $\epsilon$ is the probability of finding an outlier, and Z is a normalizing constant. The associated robust penalty function is the negative log likelihood, $$\rho(x;\sigma, \epsilon) = -\log((1-\epsilon) \exp(-x^2/(2\sigma^2)) + \epsilon). \quad (5)$$

The main motivation for using a contaminated Gaussian is to explicitly represent and reason about the inlier and outlier processes separately. Pixels which are more similar in color should have a higher penalty for motion/depth discontinuities. For example, in Section 2.3 a robust controlled smoothness constraint is proposed where the strength of the constraint depends on the neighboring pixel color similarity. This is possible because pixel color similarity affects the outlier probability but not the inlier variance. Thus, using a contaminated Gaussian provides a principled way to incorporate these effects.

2. Optimization Criteria

The actual cost function employed consists of three terms, $$C = C_I - C_T + C_S, \quad (6)$$

where $C_I$, measures the brightness (or intensity) compatibility, $C_T$ measures the temporal flow (motion/depth) compatibility, and $C_S$ measures the flow smoothness. Below, we give more details on each of these three terms.

2.1 Brightness Compatibility

The brightness compatibility term measures the degree of agreement in brightness or color between corresponding pixels, $$C_I(\{u_s\}) = \sum_s \sum_{t \in N(s)} w_{st} \sum_{x_s} v_{st}(x_s)e_{st}(x_s) \quad (7)$$

where $$e_{st}(x_s) = \rho_I(I_s(x_s) - \gamma_{st}I_t(x_t) - \beta_{st}, \sigma_I^2, \epsilon_1) \quad (8)$$

Compared with Equation (1), a visibility factor $v_{st}(x_s)$ has been added, which encodes whether pixel $x_s$ is visible in image $I_t$ (Section 2.4). In addition, the robust penalty has been generalized to allow for a global bias ($\beta_{st}$) and gain ($\gamma_{st}$) change.

2.2 Flow Compatibility

The controlled flow compatibility constraint, $$C_T(\{u_s\}) = \sum_s \sum_{t \in N(s)} w_{st} \sum_{x_s} v_{st}(x_s)c_{st}(x_s), \quad (9)$$

with $$c_{st}(x_s) = \rho_T(|u_s(x_s) - u_t(x_t)|; \sigma_T^{-2}, \epsilon_T) \quad (10)$$

enforces mutual consistency between motion/depth estimates at different neighboring keyframes.

For the constant flow motion model, the variance $\sigma_T^{-2}$ can be used to account for drift in the velocities (acceleration). For a rigid scene, no drift is expected. However, the $d_s$'s may actually be related by a projective transformation [16]. For a scene with object far enough away or for cameras arranged in a plane perpendicular to their optical axes, this is not a problem.

2.3 Flow Smoothness

The final cost term we use is a controlled flow smoothness constraint, $$C_S(\{u_s\}) = \sum_s \sum_{x_s} f_s(x_s), \quad \text{with} \quad (11)$$

$$f_s(x_s) = \sum_{x' \in N_4(x)} \rho_S(|u_s(x) - u_s(x')|; \sigma_I^{-2}, \epsilon_S(x, x')). \quad (12)$$

The value of the outlier probability is based on the brightness/color difference between neighboring pixels $$68_s(x, x') = \psi(|I_s(x) - I_s(x')|).$$

The form of this $\psi$ function and the dependence of the outlier probability on the local intensity variation can be shown as follows. Assume the prior probability $p_D$ that two neighboring pixels straddle a motion discontinuity (i.e., that they live on different surfaces) is known. The distribution of the brightness or color differences between two neighboring pixels depends on the event D that they live on different surfaces, i.e., there are two distribution $p(I_s(x) - I_s(x')|\overline{D})$ and $p(I_s(x) - I_s(x')|D)$. These distributions can either be guessed (say as contaminated Gaussians, with the probability of outliers much higher in the case of D), or estimated from labeled image data.

Given these distributions and the prior probability $p_d$, Bayes' Rule can be applied to calculate $\psi(I_s(x) - I_s(x')) = p(D|I_s(x) - I_s(x'))$. (This function will typically start at some small probability $\epsilon_0$ for small color differences, and increase to a final value $\epsilon_1$ for large differences.) This posterior probability of a motion discontinuity can then be plugged in as the local value of $\epsilon_s$ in the controlled motion continuity constraint (12).

2.4 Determining Visibility

It is believed that one of the most advantageous aspects of the multi-view matching framework is the explicit use of visibility to prevent the matching of pixels into areas which are occluded. Visibility has heretofore never been used in the estimation of motion or depth maps.

When working with rigid motion and depth/disparity estimates, the visibility computation is fairly straightforward. Consider two images, $I_s$ and $I_t$. It is desired to compute $v_{st}(x_s)$, i.e., whether pixel $x_s$ in image $I_s$ is visible at location $x_t$ in image $I_t$. If $x_s$ is visible, the values of $d_s(x_s)$ and $d_t(x_t)$ should be the same. (See the discussion in Section 2.2 of how disparities may have to be re-mapped between images in certain camera configurations). If $x_s$ is occluded, then $d_t(x_t) > d_s(x_s)$ (assuming d=0 at infinity and positive elsewhere in front of the camera). Therefore, $$v_{st}(x_s) = ((d_t(x_s) - d_s(x_t)) \leq \delta), \quad (13)$$

where $\delta$ is a threshold to account for errors in estimation and warping. Note that v is generally not commutative, e.g., $v_{st}(x_s)$ may not be the same as $v_{st}(x_t)$, since $x_t$ may map to a different pixel $x_s'$ if it is an occluder. In addition, since an occluder will not map to the same pixel as its occludee, $d_s(x_s) - d_s(x_t)$ should never be greater than $\delta$. The flow compatibility constraint will ensure that this does not occur.

In the case of general 2-D flow, the situation is more complicated. In general, it cannot be determined whether an occluding layer will be moving slower or faster than a pixel in a occluded layer. Therefore, the best that can be done is to simply compare the flow estimates, and infer that a pixel may be invisible if the two velocities disagree, $$v_{st}(x_s) = (\|u_s(x_s) - u_t(x_t)\| \leq \delta) \quad (14)$$

Regardless of the motion model, $v_{st}(x_s)$ is set to zero whenever the corresponding pixel $x_t$ is outside the boundaries of $I_t$, i.e., $x_t \notin I_t$.

In cases where not all frames are keyframes, there may be images $I_t$ without associated $u_t$. In this case, motion estimates can be warped from neighboring keyframes using z-buffering to resolve ambiguities when several pixels map to the same destination. A more detailed explanation of such a warping algorithm is found in [16].

3. Estimation Process

With the cost framework having been explained, the estimation process will now be described. In order to determine the best possible process characteristics and to compare different design choices and components, a general-purpose framework has been developed which combines ideas from hierarchical estimation [2], correlation-style search [13, 10], and sub-pixel motion/disparity estimation [12, 13].

Figure 3:
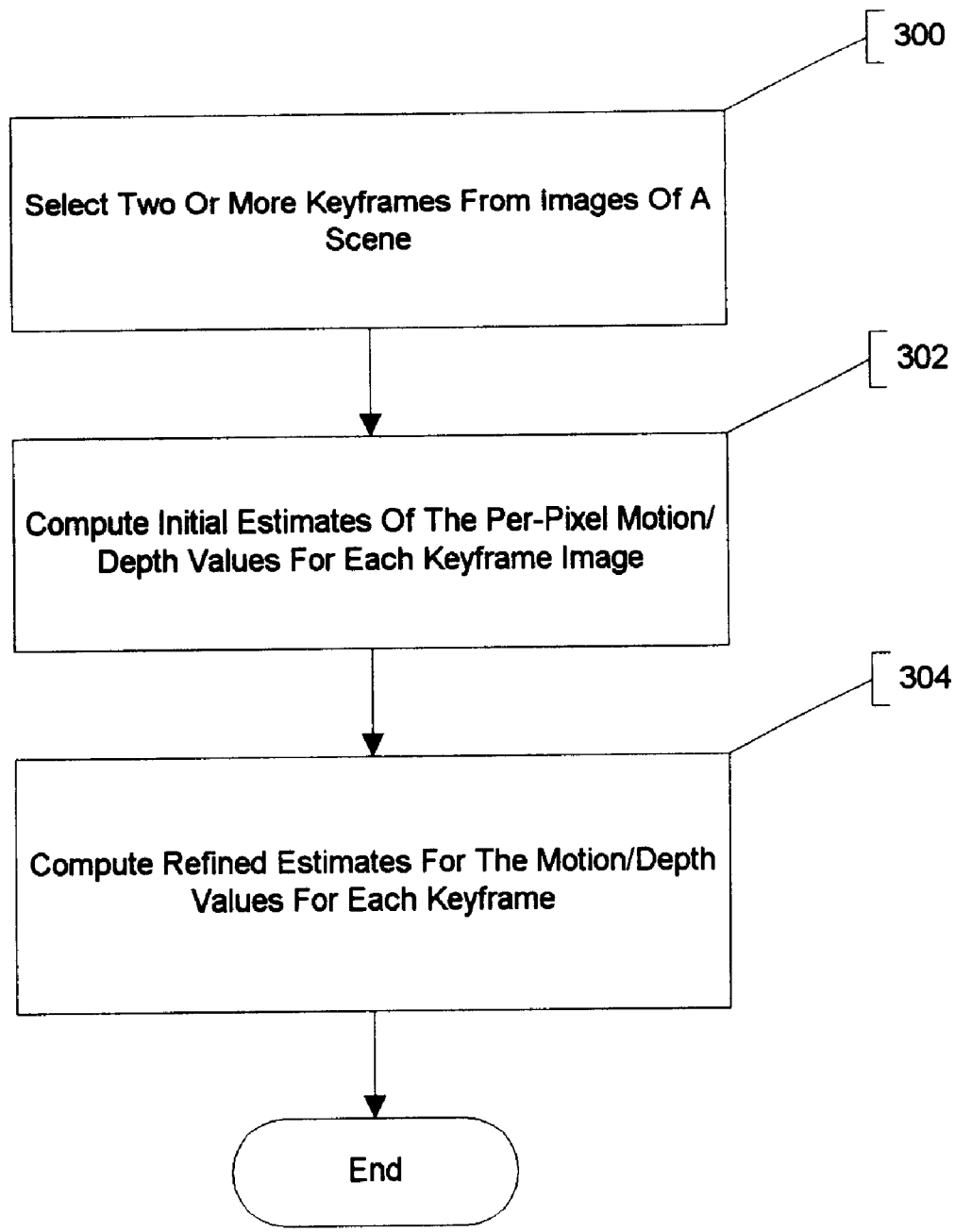
FIG. 3 is a block diagram of an overall process for estimating motion or depth values for each pixel of a collection of keyframe images according to the present invention.

The process operates in two phases. Referring to FIG. 3, during an initialization phase, keyframe images are selected from the images of the scene being characterized (step 300) and initial estimates of the per pixel motion/depth values are computed independently for each keyframe image (step 302). Since good estimates of the motion/depth values have not yet been computed for other frames, the flow compatibility term $C_T$ is ignored, and no visibilities are computed (i.e., $v_{st}=1$). In the second phase, the flow compatibility is enforced and the visibilities are computed based on the current collection of motion/depth estimates $\{u_s\}$. This allows for refined estimates of the motion/depth values to be computed for each keyframe (step 304).

3.1 Computing Initial Estimates

A preferred approach to computing the initial estimates of the motion/depth values for each pixel of a selected keyframe image is hierarchical, i.e., the matching can occur at any level in a multi-resolution pyramid, and results from coarser levels can be used to initialize estimates at a finer level. Hierarchical matching both results in a more efficient process, since fewer pixels are examined at coarser levels, and usually results in better quality estimates, since a wider range of motions can be searched and a better local minimum can be found.

Figure 4:
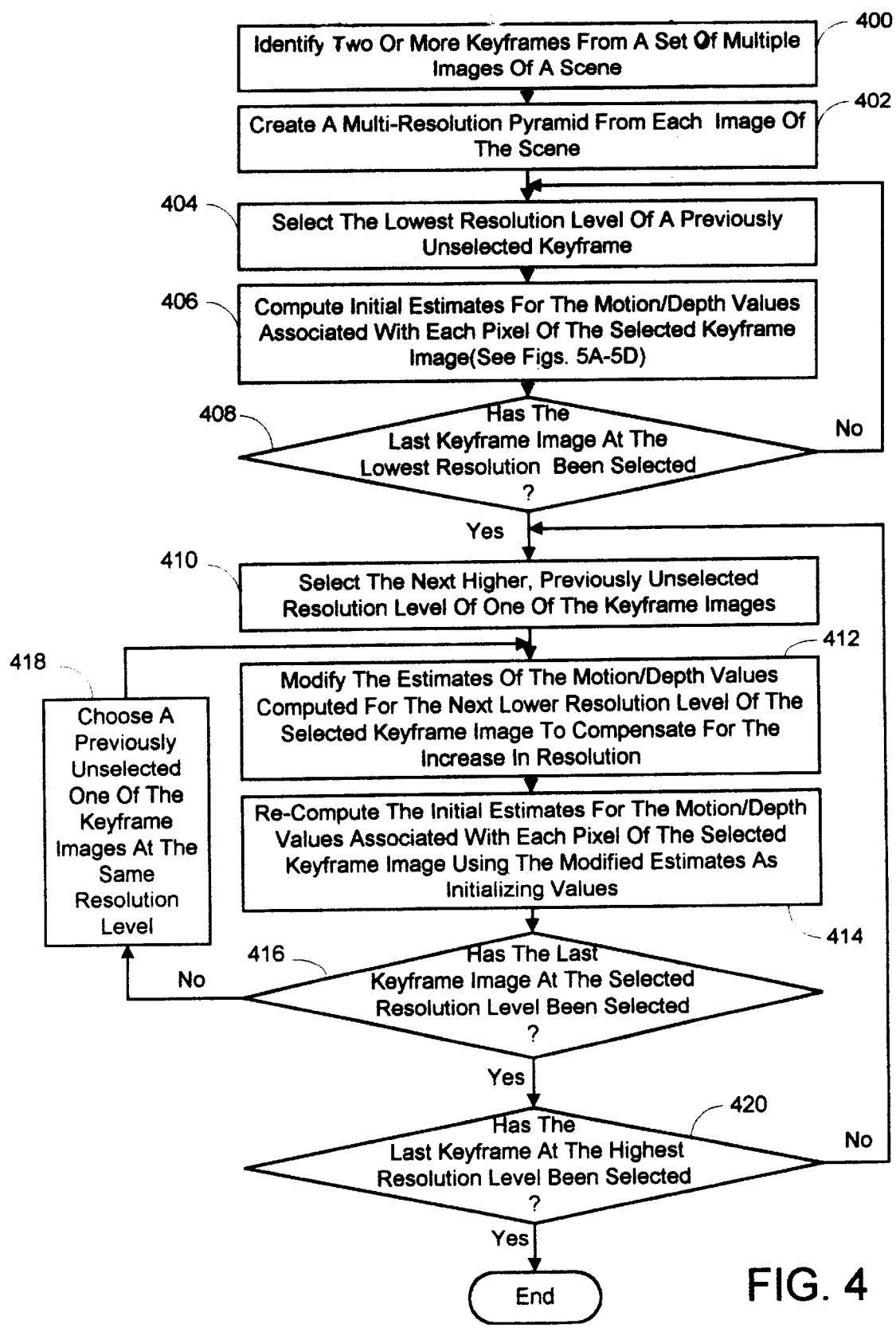
FIG. 4 is a block diagram of a refinement process for accomplishing the estimation program modules of the overall process of FIG. 3 employing a multi-resolution, hierarchical approach.

Referring to FIG. 4, the preferred implementation of the hierarchical approach begins with identifying two or more keyframe images in a set of multiple images of the scene being characterized (step 400). A multi-resolution pyramid is generated for every image in the image set in step 402. Next, in step 404, the lowest resolution level of the multi-resolution pyramid for one of the keyframe images is selected. The initial estimate for the motion/depth values associated with each pixel of the selected keyframe image is then computed (step 406). A preferred process for accomplishing this task based on the previously described cost framework will be described shortly. Once the computations of the motion/depth values for each pixel of the selected keyframe image are completed, the process is repeated for all the remaining keyframes (step 408). When all the keyframes associated with the lowest resolution level have been processed, the next step 410 is to select the next higher resolution level of one of the keyframe images. The initial estimates of the motion/depth values computed for the next lower resolution level of the newly selected keyframe image are first modified in step 412 to compensate for the increase in resolution. In the case of 2-D flow, the velocities are doubled when transferring to a finer level. In addition, the global parameters $M_{ts}$ and $e_{ts}$ should be adjusted for each level.

In step 414, the initial estimates for the motion/depth values associated with each pixel of the selected keyframe image are re-computed using these modified estimates as initializing values. A preferred process for accomplishing this task will also be described shortly. The re-computation procedure continues for each previously unselected keyframe image having the same resolution level as indicated in steps 416 and 418. After the per-pixel motion/depth value estimates are computed for each keyframe in a particular resolution level, it is determined whether remaining, higher resolution levels exist. If so, the re-computation procedure is repeated for each successively higher resolution level, preferably up to and including the highest level (step 420). The motion/depth values estimated for each pixel of each keyframe image at the highest resolution level represent the desired initial estimates which will be used to initialize the aforementioned second phase of the overall estimation process.

Figure 5A:
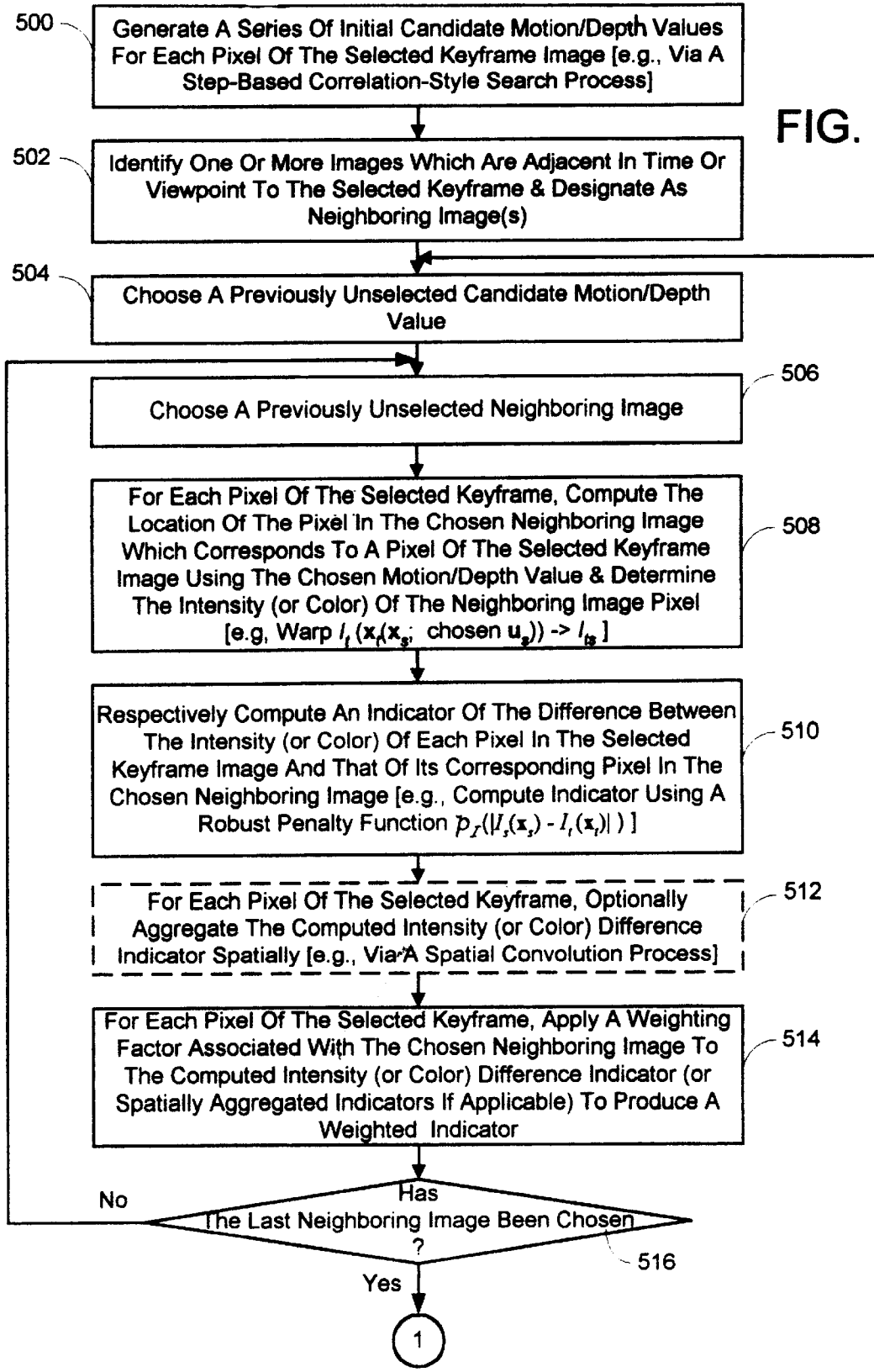
FIGS. 5A and 5B are block diagrams of a process for accomplishing the initial estimates computation program module of the overall process of FIG. 3.

Referring now to FIG. 5A, a preferred implementation of the process for computing the initial estimates of the motion/depth values for each pixel of each keyframe image at the lowest resolution level will be described. As previously indicated, this process is based on the cost framework presented earlier. First, in step 500, a series of initial candidate motion/depth values are generated for each pixel of a selected keyframe, preferably using the aforementioned step-based correlation-style search process. For example, one of the candidate values could be zero (0) with the other candidate values representing progressively larger increments away from zero.

One or more images adjacent in time or viewpoint to the selected keyframe are identified and designated as neighboring images (step 502). It is noted that while the use of just one neighboring image is feasible, it is preferred that at least two neighboring images be identified for each keyframe. For example, if two neighboring images are employed, the input images captured at a time just before and just after the selected keyframe image, or images taken from viewpoints on either side of the keyframe image, would be appropriate choices. Further, it is believed that the accuracy of the motion/depth estimates would improve with the use of additional neighboring images, and so the use of more than two neighboring images is preferred.

Next, one of the candidate motion/depth values is chosen (step 504) In addition, one of the neighboring images is chosen (step 506).

The process continues with the following steps (i.e., 508 through 518) being respectively performed for each pixel of the selected keyframe image. Specifically, in step 508, the location of the pixel in the chosen neighboring image which corresponds to a pixel in the selected keyframe image is computed using the initializing motion/depth value assigned to the pixel. The intensity or color of the so identified neighboring image pixel is also identified. The intensity of the pixel is typically used when dealing with gray scale images. However, when color images are involved, it is preferred to identify another characteristic of the pixel. As indicated earlier, the process now being described could be repeated for each color channel. However, it is believed that it would be possible to represent the color of the pixel via a combined factor, such as the so-called color-space of the pixel, because typically all bands are affected similarly between images. It will be assumed in the remainder of this description that the intensity or an appropriate combined indicator of pixel color is employed. One preferred way of accomplishing the foregoing task of identifying the intensity (or color) of a corresponding pixel in a neighboring image is to warp intensity or color estimates from the neighboring image, i.e. warp $I_t(x_t(x_{st}; u_s)) \to I_{ts}$ [16]. Once the intensity (or color) of each corresponding neighboring image pixel is identified, an indicator of the difference between the intensity (or color) of the each respective neighboring image pixel and its corresponding keyframe image pixel is computed in step 510. It will be recalled that the indicator is preferably computed using a robust penalty function $p_I(|I_s(x_s)-I_t(x_t)|)$. Further, it is preferred that the penalty function be based on a contaminated Gaussian distribution and generalized to account for global bias and gain changes between images of the scene, as discussed previously.

To improve the estimates of the motion/depth values being computed, an explicit correlation-style search over discrete motion hypothesis procedure is preferably implemented. In the correlation-style search, we evaluate several motion or disparity hypotheses at once, and then locally pick the one which results in the lowest local cost function. To rank the hypotheses, we evaluate the local error function $e_{ts}(x_s, \hat{u}_s)$ given in Equation (8) (the dependence on $\hat{u}_s$ is made explicit). The flow hypotheses $\hat{u}_s$ are obtained from $\hat{u}_s = u_s + \Delta u_s$, where $u_s$ is the current estimate, $\Delta u_s = (iS, jS)$ S is a step size, and i=-N ... N, j=-N ... N is a (2N+1)×(2N+1) search window. For rigid motion, only a 1-D search window of size (2N+1) over possible d values is used. Furthermore, only non-negative disparities are ever evaluated, since negative disparities lie behind the viewer, assuming that $M_{st}$ is the plane at infinity.

In other words, we take the current flow field $u_s$ and add a fixed step in (u,v) before performing the re-sampling (warping) of image $I_t$. This is similar to the iterative re-warping algorithms described in [2, 17], as opposed to algorithms based on shifting a square correlation window [12, 13, 10]. Note, however, that if the initial (current) flow estimate is zero (0), the behavior of this part of the process is the same as that of a simple correlation window. The advantage of iterative warping is that it results in better matches (and hence, more accurate estimates) in regions with severe foreshortening or inhomogeneous motion.

It is noted that the intensity (or color) difference indicator computed in step 510 for each pixel of the selected keyframe image (and which corresponds to the $e_{ts}(x_s)$ term described previously in connection with Equations 7 and 8) amounts to a local error function in respect to each pixel of the selected keyframe. However, these values of the local error function, i.e., $e_{st}(x_s, \hat{u}_s)$, may not be sufficient to reliably determine a winning $\hat{u}_s$ at each pixel. Traditionally, two approaches have been used to overcome this problem. These approaches can optionally be adopted in the present process to increase its reliability. The first approach is to aggregate evidence spatially, using for example square windows (of potentially variable size) [10], convolution, pyramid-based smoothing [2], or non-linear diffusion [14]. In tested embodiments of the present estimation process a spatial convolution procedure was employed to spatially aggregate the aforementioned local error function, $$\tilde{e}_{st}(x_s, \hat{u}_s) = e_{st}(x_s, \hat{u}_s) * W(x), \tag{15}$$

where W(x) is an iterated separable (¼, ½, ¼) convolution kernel. Thus, the reliability of the motion/depth estimates for each pixel of the selected keyframe can be improved by optionally aggregating the computed intensity (or color) difference indicator spatially, preferably via a spatial convolution process (step 512).

A weighting factor, which is indicative of the degree to which the chosen neighboring image is to contribute to the estimation of motion/depth values in the selected keyframe image, is applied to the computed intensity (or color) difference indicator (or spatially aggregated indicator if applicable) of each pixel of the selected keyframe to produce a weighted indicator (step 514) for each pixel. The process of generating a weighted indicator (i.e., steps 506–514) for each keyframe pixel is then repeated for all the remaining neighboring images as indicated in step 516. Once all the weighted indicators are generated, they are summed to produce an local intensity (or color) compatibility cost factor for the chosen pixel (step 518).

The foregoing process produces a local cost factor for each pixel of the keyframe based on the currently selected candidate motion/depth value. The entire process (i.e., steps 504 through 518) is then repeated for each remaining candidate motion/depth value as indicated in step 520. This results in a series of local cost factors for each pixel, each based on one of the candidate motion/depth values.

In the next step 522, the lowest cost among the intensity (or color) compatibility cost factors for each pixel of the selected keyframe is identified and the motion/depth value associated with the lowest cost factor for a pixel is assigned as the initial estimated motion/depth value of that pixel.

Figure 5B:
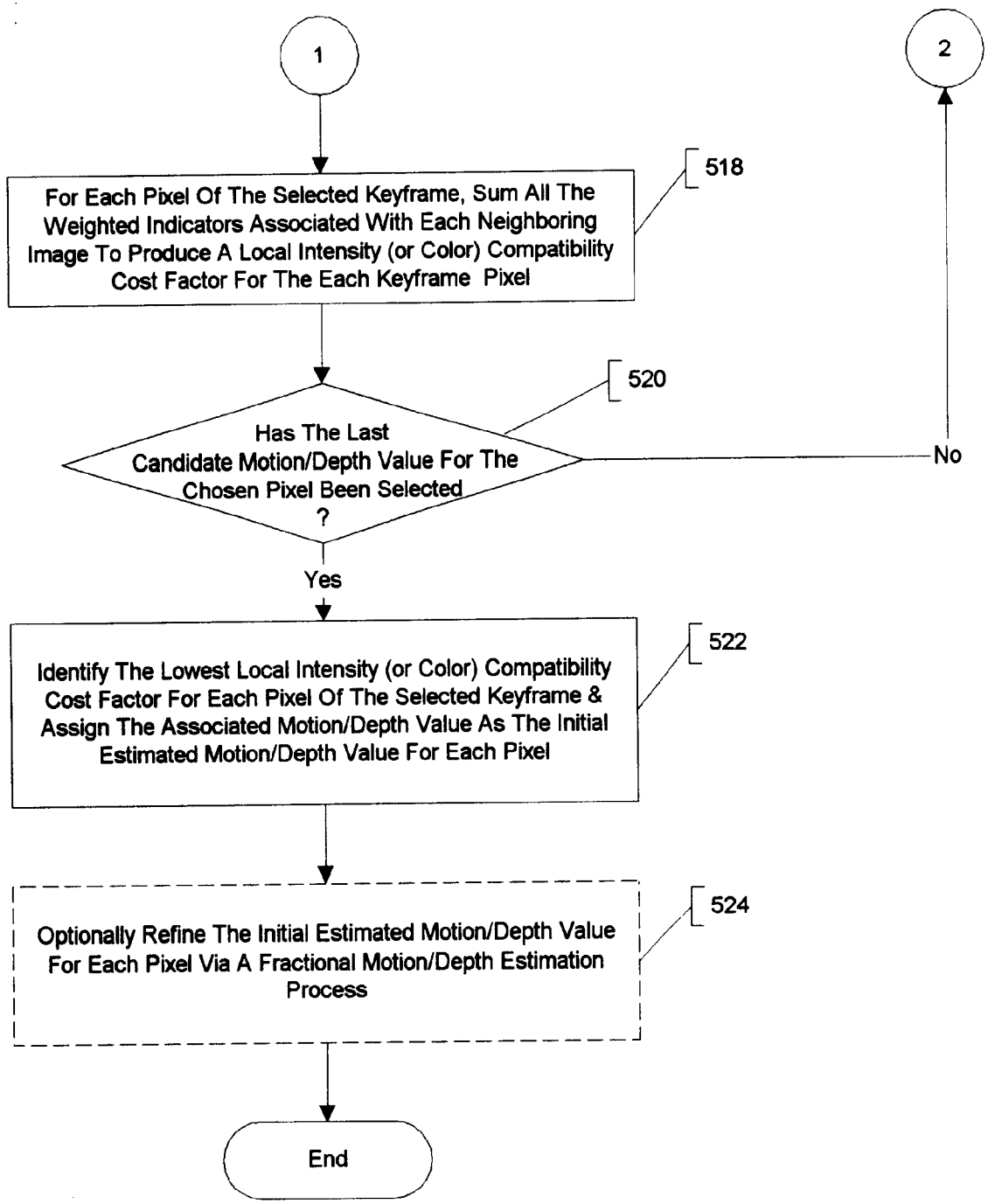

While the initial estimates of the motion/depth values produced via the foregoing process are sufficient for many application, they can be improved even further if desired. To obtain motion estimates with better accuracy, a fractional motion/depth estimate can be computed for each pixel of the selected keyframe by fitting a quadratic cost function to the cost function values around the minimum and analytically computing the minimum of the quadratic function [13], as shown in optional step 524 in FIG. 5B. For 2-D flow, the minimum cost hypothesis is used along with 5 of its 8 ($N_8$) neighbors to fit the quadratic. However, it is preferred that this fractional disparity fitting is disabled if the distance of the analytic minimum from the discrete minimum is more than a ½ step.

3.2 Multi-View Estimation

Figure 6:
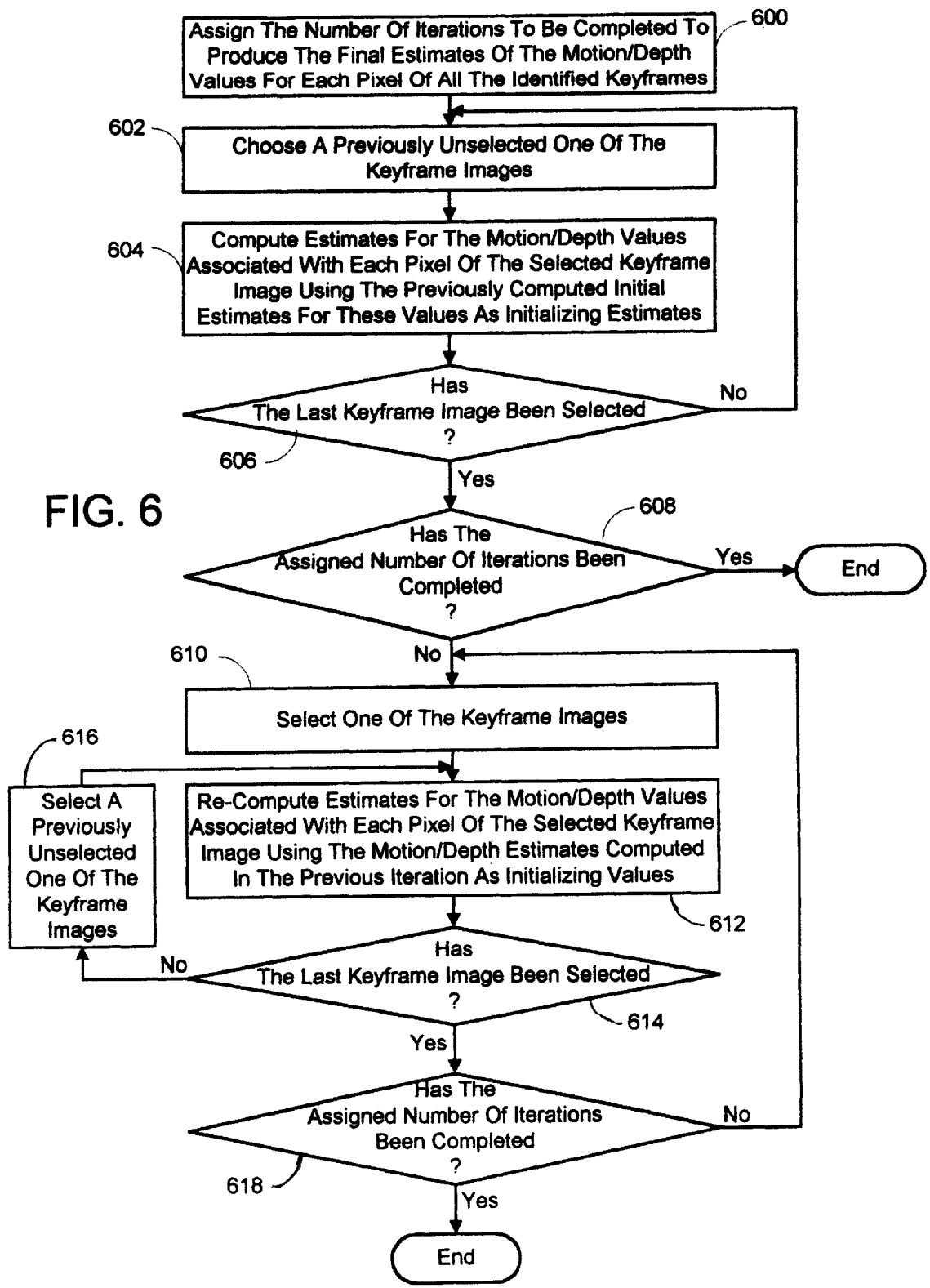
FIG. 6 is a block diagram of a refinement process for accomplishing the estimation program modules of the overall process of FIG. 3 employing an iterative approach.

Once an initial set of motion estimates $\{u_s\}$ have been computed, it is possible to compute the visibilities $v_{st}(x_s)$ and add in the flow compatibility constraint $C_T$. The final estimates of the motion/depth values are then generated. In general, it is preferred that the final estimates be computed as depicted in FIG. 6. The first step 600 in the process is to assign the number of iterations that are to be completed to produce the final estimates of the motion/depth values for each pixel of all the previously identified keyframes. One of the keyframes is then selected (step 602), and estimates for the motion/depth values associated with each pixel of the selected keyframe image are computed using the previously computed initial values as initializing estimates (step 604). A preferred process for accomplishing this task based on the previously described cost framework will be described shortly. The estimation step is repeated for each of the keyframe images as indicated in step 606. If only one iteration is to be performed, the process ends at this point and the current motion/depth estimates become the final estimates (step 608). Otherwise, the process continues by first re-selecting one of the keyframes (step 610) and then re-computing the motion/depth estimates for each pixel of the selected keyframe image (step 612). However, this time the estimates are derived using the motion/depth values computed for the keyframe in the last iteration as initializing values, rather than the previously computed initial estimates. Once again, this re-estimation process is repeated for each of the keyframes as indicated in steps 614 and 616. Once motion/depth estimates have been computed for each pixel of every keyframe image, the foregoing process (steps 610–616) is repeated for the assigned number of iterations (step 618). The results from the last iteration then designated as the final motion/depth estimates.

Figure 7A:
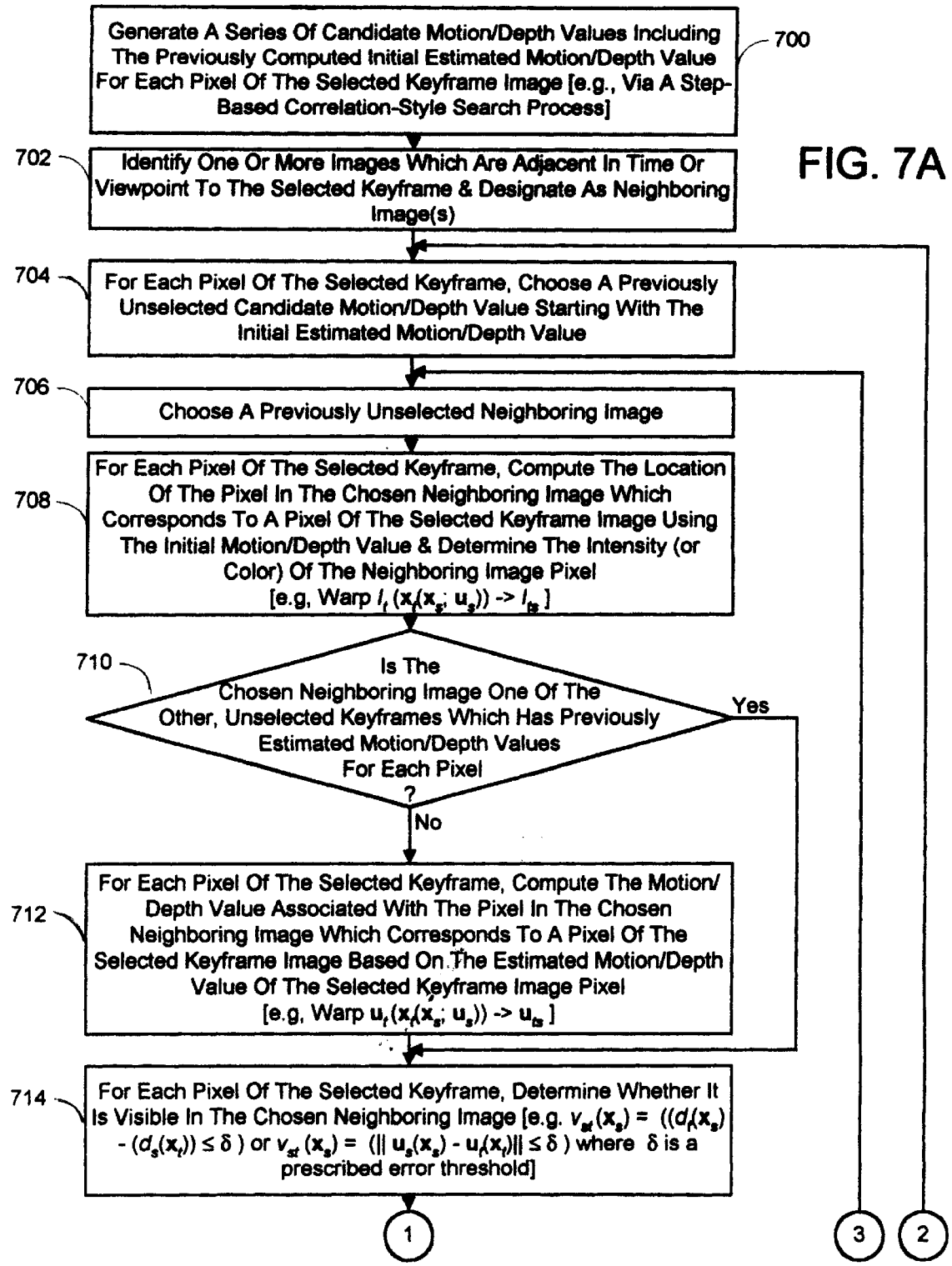
FIGS. 7A through 7D are block diagrams of a process for accomplishing the final estimates computation program module of the overall process of FIG. 3.

Referring now to FIGS. 7A–D, a preferred implementation of the process for computing the estimates for the motion/depth values associated with each pixel of the selected keyframe image using the previously computed initial values as initializing estimates (see step 604 of FIG. 6) will be described. It is noted that an identical procedure is used to re-compute the estimates in subsequent iterations, except that the estimates from the previous iteration are employed as initializing values rather than the initial estimates. It is also noted that the process is based on the cost framework described previously, and so is similar in many aspects to the process used to produce the initial estimates of the motion/depth values. As depicted in FIG. 7A, the first step 700 of the process is to generate a series of candidate motion/depth values, including the initial estimates computed in the first phase of the process, for each pixel, preferably using the aforementioned step-based correlation-style search process. Next, in step 702, one or more images adjacent in time or viewpoint to the selected keyframe image are identified and designated as neighboring images. As discussed in connection with FIG. 5A, while one or two images could be employed, it is preferred that more than two images are used to improve the accuracy of the motion/depth estimates. One of the candidate motion/depth values is then chosen for each pixel, starting with the initial estimate (step 704). In addition, one of the neighboring images is chosen (step 706). The next step 708, involves computing, for each pixel of the selected keyframe image, the location of the pixel in the chosen neighboring image which corresponds to a pixel in the selected keyframe image, using the initializing motion/depth value assigned to the keyframe pixel. The intensity or color of the so identified neighboring image pixel is also identified. As stated previously, this can be accomplished via a warping procedure. It is next determined whether the chosen neighboring image is one of the unselected keyframes (step 710). If the neighboring image is not a keyframe, then the motion/depth value of each of the neighboring image's pixels that corresponds to a pixel of the selected keyframe must be computed (step 712), since no previous estimates will exist. In general, this estimate is based on the current motion/depth estimate of the selected keyframe's pixels. One preferred way of obtaining the estimate of the neighboring pixel's motion/depth value is to warp it, i.e., warp $u_r(x_r(x_s; u_s)) \rightarrow u_{ts}$ [16]. If, however, the neighboring image is one of the keyframe images, then the previously estimated motion/depth value of the neighboring image's pixels can be employed in the steps that are to follow.

The next step 714 in the estimation process is determine whether each pixel of the selected keyframe image is visible in the chosen neighboring image. For those pixels which are not visible in a given frame, i.e., $v_{st}(x_s)=0$, what cost function should be assigned? This issue arises not only when performing multi-view estimation, but even in the initial independent motion estimation stage, whenever pixels are mapped outside the boundaries of an image, i.e., $x_r \notin I_r$. One possibility is to not pay any penalty, i.e., to set $e_{st}(x_s, \hat{u}_s)$ (and $c_{st}$) to 0 whenever $v_{st}(x_s)=0$. Unfortunately, this encourages pixels near image borders to have large, outward-going flows. Another possibility is to set $e_{st}(x_s, \hat{u}_s)=\rho(\infty)$. Unfortunately, this encourages pixels near image borders to have inward-directed flows. The preferred solution is to use the visibility field $v_{st}$ as a mask for a morphological fill operation. In other words, entries in $C_L(x_s, \hat{u}_s)$ are replaced with their neighbors' values whenever $v_{st}(x_s)=0$. The preferred filling algorithm used is a variant of the multi-resolution push/pull algorithm described in [7]. Thus, if the filling algorithm is employed, the term $v_{st}e_{st}$ should be replaced with an $\hat{e}_{st}$ term representing the filled error function in Equations 7 and 9.

Figure 7B:
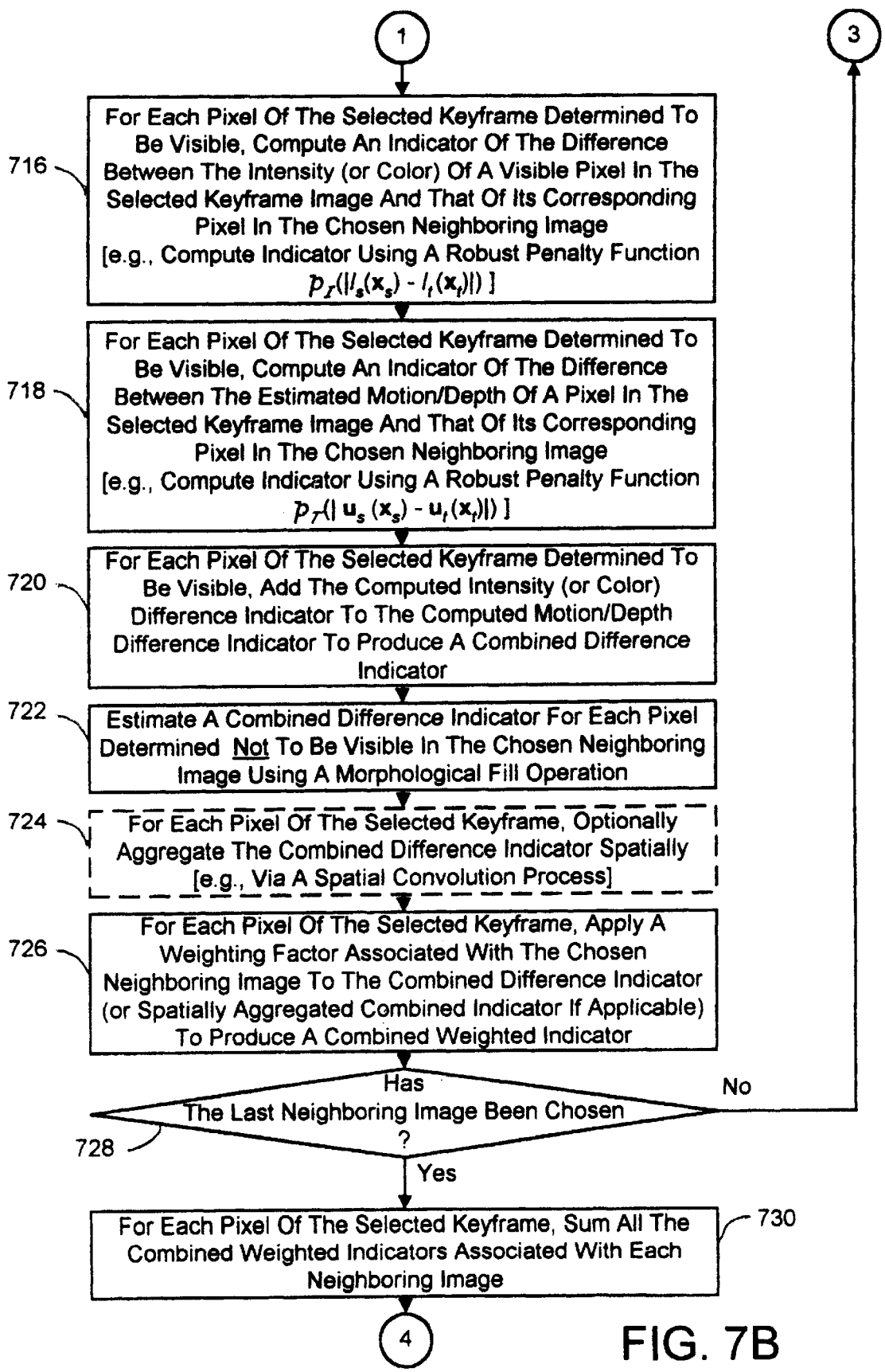

Referring now to FIG. 7B, the following steps (i.e., 716 through 720) are performed for each pixel of the selected keyframe determined to be visible. Specifically, in step 716, an indicator of the difference between the intensity (or color) of the visible pixel and that of the corresponding neighboring image pixel is computed. As when computing the similar intensity (or color) difference indicator in connection with producing the initial estimates of the motion/depth values, it is preferred that a robust penalty function be employed $p_I(|I_s(x_s)-I_r(x_r)|)$, and more particularly one based on a contaminated Gaussian distribution and generalized to account for global bias and gain changes between images of the scene. In step 718, an indicator of the difference between the current estimated motion/depth value of the visible pixel in the selected keyframe image and that of its corresponding pixel in the chosen neighboring image is computed. It is preferred that a robust penalty function be employed $p_T(|u_s(x_s)-u_r(x_r)|)$, to compute this motion/depth difference indicator as well. And, as with the intensity (or color) difference indicator, it is preferred that a the penalty function be based on a contaminated Gaussian distribution.

The computed intensity (or color) difference indicator is next added to the motion/depth difference indicator to produce combined difference indicator (step 720) for each of the visible pixels. These combined difference indicators (which essentially represent costs factors) are then employed to establish similar indicators for each of the pixels of the keyframe that were determined not to be visible. This is accomplished, as indicated in step 722 by using a conventional morphological fill operation.

As with the estimation of the initial motion/depth values, the reliability of the current estimates can be improved by optionally aggregating the combined difference indicator spatially, preferably via a spatial convolution process as indicated by optional step 724. A weighting factor associated with the chosen neighboring image is then applied to the combined difference indicator (or spatially aggregated combined indicator if applicable) to produce a combined weighted indicator (step 726). The process of generating a combined weighted indicator is then repeated for all the remaining neighboring images as indicated in step 728. Once all the combined weighted indicators are generated, they are summed in step 730 for each pixel of the selected keyframe.

The other major approach to local ambiguity is the use of smoothness constraints [8]. The preferred smoothness constraint was generally described in Section 2.3. The present process optionally uses this approach (as well as spatial aggregation) to improve the reliability of the motion/depth estimates. In the preferred implementation, this smoothness constraints was disabled when performing the initial estimate, but is in the present phase of the estimation process so as to reduce the amount of spatial aggregation. Note that for the smoothness constraint to be meaningful, $f_s(x_s, \hat{u}_s)$ should be evaluated with the neighboring values of $u_s$ set to their current (rather than hypothesized) values.

To find the best motion/depth hypothesis at each pixel, it is preferred that the spatially aggregated error function be summed for each temporal neighbor and then the smoothness term added to obtain a local cost function, $$C_L(x_s, \hat{u}_s) = \sum_{t \in N(s)} w_{st} \tilde{e}_{st}(x_s, \hat{u}_s) + f_s(x_s, \hat{u}_s), \tag{16}$$

Based on this set of cost estimates, $C_L(x_s, \hat{u}_s)$, $\hat{u}_s \in H$, where H is the set of new motion hypotheses, the $\hat{u}_s$ with the lowest (best) cost at each pixel is chosen. (This corresponds to the "winner-take-all" step of many stereo algorithms.)

Figure 7C:
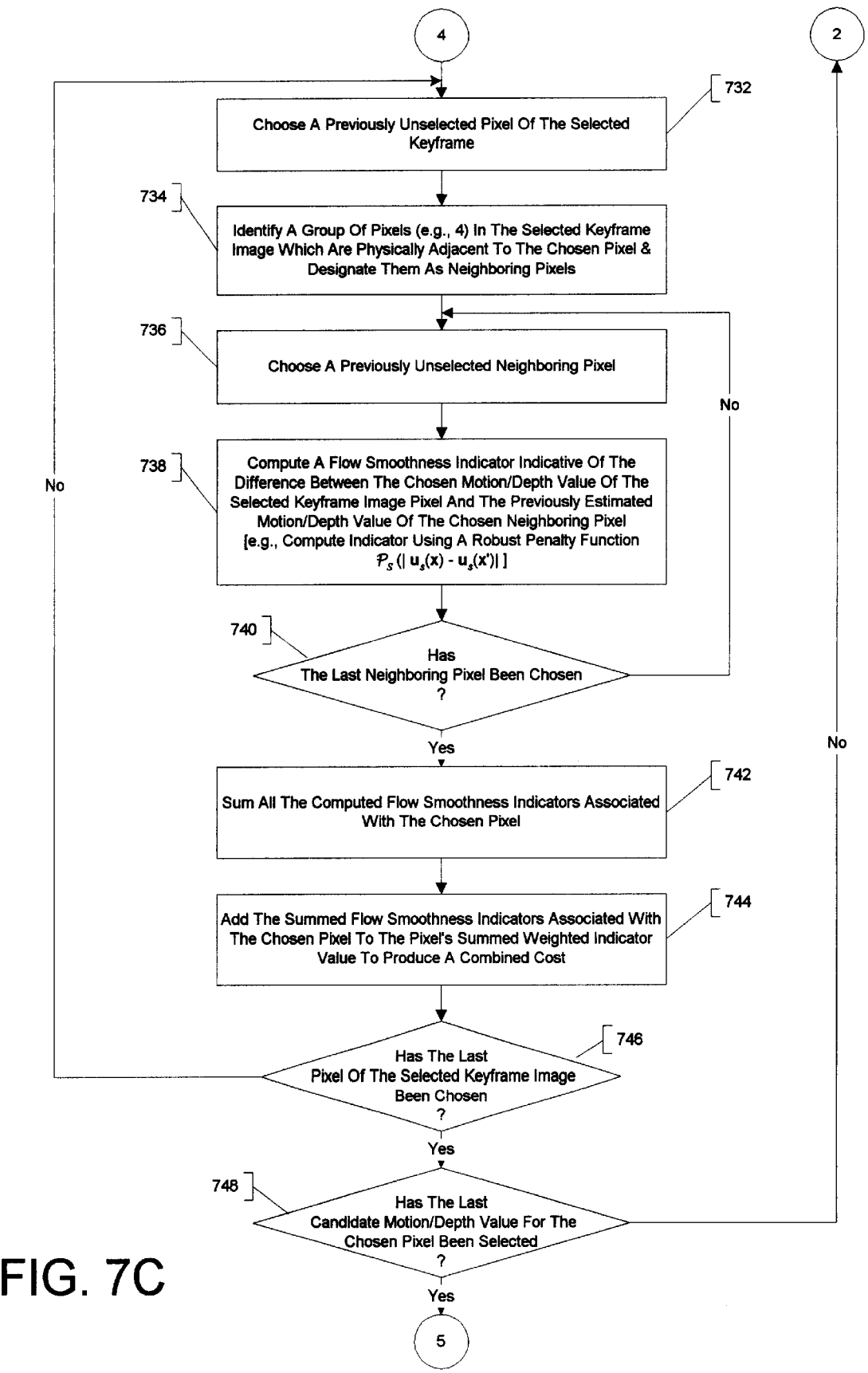

Referring now to FIG. 7C, the next step 732 in the estimation process is to choose a previously unselected pixel of the selected keyframe image. Then, in step 734, a group of pixels (e.g., 4) in the selected keyframe image which are physically adjacent to the chosen pixel are identified. These adjacent pixels are designated as neighboring pixels, and one of them is chosen (step 736). A flow smoothness indicator representative of the difference between the chosen motion/depth value of the selected keyframe image pixel and the previously assigned value of the chosen neighboring pixel is computed in step 738. This flow smoothness indicator is also preferably computed using a robust penalty function $p_s(|u_s(x)-u_s(x')|)$, and more particularly, one based on a contaminated Gaussian distribution. A flow smoothness indicator is also computed for each of the remaining neighboring pixels in step 740. These indicators are then summed in step 742. In the next step 74, the summed flow smoothness indicator associated with the chosen pixel are added to the pixel's summed combined weighted indicator to produce a combined cost. This process of generating a combined cost (i.e., steps 732 through 744) is repeated for each remaining pixel of the selected keyframe image that was previously determined to be visible, as indicated in step 746. Thus, a combined cost has now been estimated for each pixel in the selected keyframe.

Once a combined cost has been established for each pixel in the keyframe, the entire process (i.e., steps 704 through 746) is repeated for each candidate motion/depth value associated with the chosen pixel as indicated in step 748. This results in a series of combined cost values for each pixel, each based on one of the candidate motion/depth values.

Figure 7D:
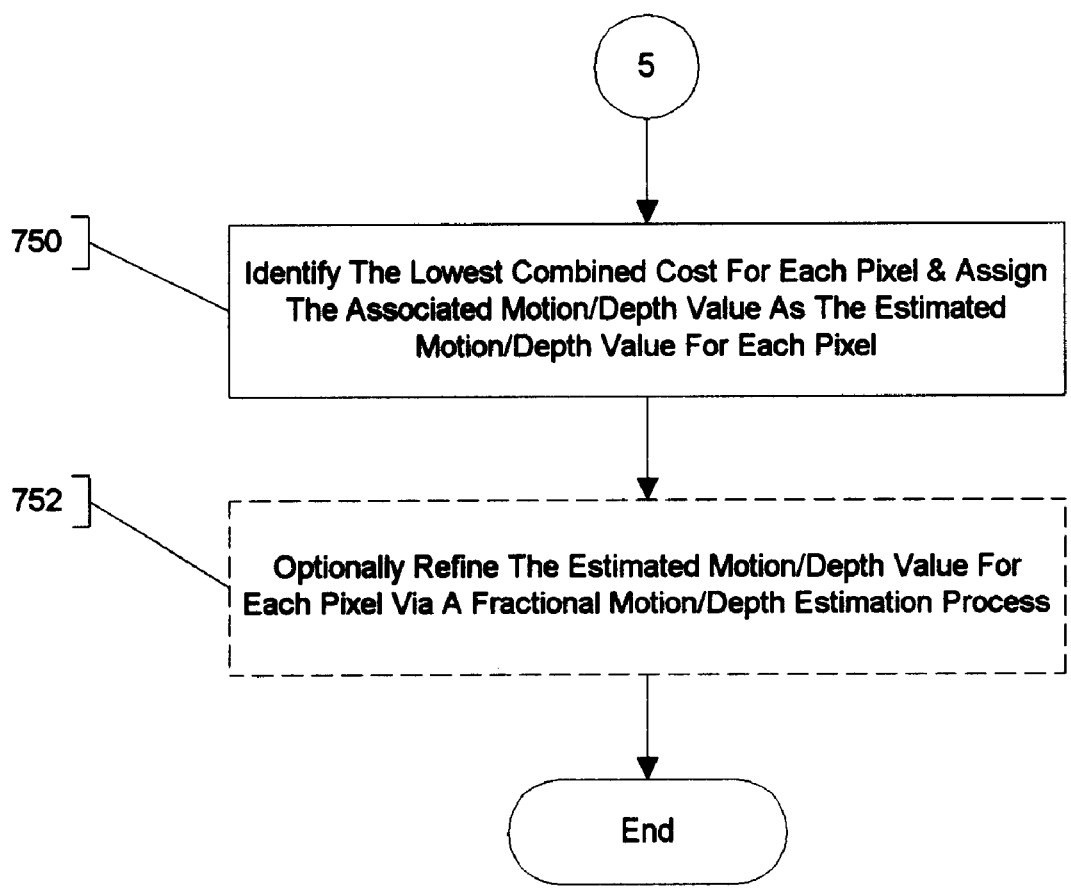

Referring now to FIG. 7D, the next step 750 of the process is to identify the lowest combined cost for each pixel from the aforementioned series of costs and to assign the associated motion/depth value as the estimated motion/depth value for the chosen pixel. In this way an estimated motion/depth map is created for the selected keyframe image.

As with the initial estimates of the motion/depth values, improved accuracy can be obtained by employing a fractional motion/depth estimation procedure. Referring to FIG. 7D, a fractional estimate can optionally be computed for each pixel of a selected keyframe by fitting a quadratic cost function to the cost function values around the minimum and analytically computing the minimum of the quadratic function [13], as shown in step 752. Here again, for 2-D flow, the minimum cost hypothesis is used along with 5 of its 8 ($N_8$) neighbors to fit the quadratic, and the fractional disparity fitting is preferably disabled if the distance of the analytic minimum from the discrete minimum is more than a ½ step.

In the foregoing description of the initial and final phases of the multi-view estimation process, the hierarchical approach to improving the estimates was used exclusively in estimating the initial motion/depth values. Similarly, the iterative approach to refining the estimates was used exclusively in estimating the final motion/depth values. It is believed that for most applications this scenario will produce rich, accurate results with the minimum processing cost. However, if desired, the hierarchical and iterative approaches could be employed differently. In general, one or both of these approaches can be used in either the initial or final estimation phases of the process. It is noted that if both approaches are used within a single phase of the estimation process, the accuracy may be improved, however at the cost of increased processing time and increased memory requirements. Further, while it is preferred that the hierarchical refinement approach progress from the lowest resolution level to the highest level, this need not be the case. If extreme accuracy is not required, the refinement procedure can be terminated at a resolution level below the highest. The estimates may not be as accurate if this option is taken, however processing time can be shortened.

In addition, the multi-view estimation process was described as sequentially computing the motion/depth values for each pixel of a keyframe. However, given sufficient processor resources and memory, it would be possible to speed up the estimation process by computing the motion/depth values for each pixel simultaneously.

It is also noted that the process described in Section 3 deviated somewhat from the cost framework explained in Section 2. A strategy of sweeping through the keyframes was employed in the described process, rather than the global estimation proposed in the cost framework. Sweeping through the keyframes refers to the process of independently optimizing the motion/depth value estimates on a per pixel basis for each keyframe image in turn. Thus, the various cost factors computed for each individual pixel in a keyframe where not accumulated as suggested by the cost framework Equations 7, 9 and 11. Additionally, this accumulated cost for each keyframe was not summed to produce a global cost and then compared to other global costs computed using other candidate motion/depth values. It is believed the streamlined process described in Section 3 is easier to implement and requires less memory. However, if desired, the aforementioned global aspects of the cost framework can be implemented as well.

4. Experiments

We have applied our multi-view matching process to a number of image sequences, both where the camera motion is known (based on tracking points and computing structure from motion), and where the flow is uniform over time (video sequences). FIGS. 8 and 9 show some representative results and illustrate some of the features of our process.

In both sets of figures, images (a–c) show the first, middle, and last image in the sequence (we used the first 4 even images from the flower garden sequence and 5 out of 40 images from the symposium sequence). The depth maps estimated by the initial, independent analysis process (Section 3.1) are shown in images (e–g). The final results of applying our multi-view estimation process (Section 3.2) with flow smoothness, flow compatibility, and visibility estimation are shown in images (i–k). Notice the improved quality of the final estimates obtained with the multi-view estimation process, especially in regions that are partially occluded. For example, in FIG. 8, since the tree is moving from right to left, the occluded region is to the left of the tree in the first image, and to the right of the tree in the last one. Notice how the opposite edge of the trunk (where disocclusions are occurring) looks "crisp".

Image (d) in both Figures shows the results of warping one image based on the flow computed in another image. Displaying these warped images as the process progresses is a very useful way to debug the process and to assess the quality of the motion/depth estimates. Without visibility computation, image (d) shows how the pixels in occluded regions draw their colors somewhere from the foreground regions (e.g., the tree trunk in FIG. 8 and the people's heads in FIG. 9).

Images (h) and (i) show the warped images with invisible pixels flagged as black (the images were generated after the initial and final estimation stages, and hence correspond to the flow fields shown to their left). Notice how the process correctly labels most of the occluded pixels, especially after the final estimation. Notice, also, that some regions without texture such as the sky sometimes erroneously indicate occlusion. Using more smoothing or adding a check that occluder and occludees have different colors could be used to eliminate this problem (which is actually harmless, if we are using our matcher for view interpolation or motion prediction applications).

5. Other Approaches

While the invention has been described in detail by reference to the preferred embodiment described above, it is understood that variations and modifications thereof may be made without departing from the true spirit and scope of the invention. For example, it was discussed previously how the estimates of the motion/depth values could be improved by employing the step-based correlation-style search procedure. However, other procedures could also be implemented to produce the desired series of candidate motion/depth values. One such procedure involves the use of a Lucas-Kanade style gradient descent on the local cost function. In the gradient descent approach, derivatives of the terms in the local cost function are taken with respect to infinitessimal changes in both the horizontal and vertical motion components (for 2-D flow) or in disparity (rigid motion). Theses terms involve image gradients, differences between neighboring or corresponding flow estimates (for $f_s$ and $c_{st}$), and derivatives of the robust functions [4]. Outer products of these derivatives would be taken and aggregated spatially and temporally, just as in the correlation-style search approach. Finally, a 2×2 linear system would be solved at each pixel to determine the local change in motion/depth.

The details of these steps are omitted since they can be readily derived using the techniques described in [2, 17].

References

[1] S. Baker, R. Szeliski, and P. Anandan. A layered approach to stereo reconstruction. In *CVPR'98*, pp. 434–441, Santa Barbara, June 1998.

[2] J. R. Bergen, P. Anandan, K. J. Hanna, and R. Hingorani. Hierarchical model-based motion estimation. In *ECCV'92*, pp. 237–252, Santa Margherita, May 1992.

[3] M. J. Black and A. D. Jepson. Estimating optical flow in segmented images using variable-order parametric models with local deformations. *IEEE Trans. Patt. Anal. Mach. Intell.*, 18(10):972–986, October 1996.

[4] M. J. Black and A. Rangarajan. On the unification of line processes, outlier rejection, and robust statistics with applications in early vision. *Intl. J. Comp. Vision*, 19(1):57–91, 1996.

[5] R. T. Collins. A space-sweep approach to true multi-image matching. In *CVPR'96*, pp. 358–363, San Francisco, June 1996.

[6] P. E. Debevec, C. J. Taylor, and J. Malik. Modeling and rendering architecture from photographs: A hybrid geometry- and image-based approach. *Computer Graphics (SIGGRAPH'96)*, pp. 11–20, August 1996.

[7] S. J. Gortler, R. Grzeszczuk, R. Szeliski, and M. F. Cohen. The lumigraph. In *Computer Graphics (SIGGRAPH'96)* pp. 43–54, Au-gust 1996.

[8] B. K. P. Horn and B. G. Schunck. Determining optical flow. *Artificial Intelligence*, 17:185–203,1981.

[9] S. S. Intille and A. F. Bobick. Disparity-space images and large occlusion stereo. In *ECCV'94*, Stockholm, Sweden, May 1994. Springer-Verlag.

[10] T. Kanade and M. Okutomi. A stereo matching algorithm with an adaptive window: Theory and experiment. *IEEE Trans. Patt. Anal. Mach. Intell*, 16(9):920–932, Sept. 1994.

[11] D. Le Gall. MPEG: A video compression standard for multimedia applications. *CACM*, 34(4):44–58, April 1991.

[12] B. D. Lucas and T. Kanade. An iterative image registration technique with an application in stereo vision. In *IJCAI-81*, pp. 674–679, Vancouver, 1981.

[13] L. H. Matthies, R. Szeliski, and T. Kanade. Kalman filter-based algorithms for estimating depth from image sequences. *Intl. J. Comp. Vision*, 3:209–236, 1989.

[14] D. Scharstein and R. Szeliski. Stereo matching with nonlinear diffusion. *Intl. J. Comp. Vision*, 28(2):155–174, July 1998.

[15] S. M. Seitz and C. M. Dyer. Photorealistic scene reconstrcution by space coloring. In *CVPR'97*, pp. 1067–1073, San Juan, PuertoRico, June 1997.

[16] J. Shade, S. Gortler, L.-W. He, and R. Szeliski. Layered depth images. In *Computer Graphics (SIGGRAPH'98)* Proceedings, pp. 231–242, Orlando, July 1998.

[17] R. Szeliski and J. Coughlan. Hierarchical spline-based image registration. *Intl. J. Comp. Vision*, 22(3):199–218, March/April 1997.

[18] R. Szeliski and P. Golland. Stereo matching with transparency and matting. In *ICCV'98*, pp. 517–524, Bombay, January 1998.

[19] J. Y. A. Wang and E. H. Adelson. Layered representation for motion analysis. In *CVPR'93*, pp. 361–366, New York, N.Y. ork, June 1993.

[20] Y. Weiss. Smoothness in layers: Motion segmentation using nonparametric mixture estimation. In *CVPR'97*, pp. 520–526, San Juan, Puerto Rico, June 1997.

What is claimed is:

1. A computer-implemented process for estimating motion or depth values for multiple images of a 3D scene, comprising using a computer to perform the following acts:

inputting the multiple images of the 3D scene;

selecting at least two images from the multiple images, hereafter referred to as keyframes;

creating a motion or depth map for each keyframe by estimating a motion or depth value for each pixel of each keyframe using motion or depth information from images neighboring the keyframe in viewpoint or time.

2. The process of claim 1, wherein the act of estimating comprises the acts of:

computing initial estimates of the motion or depth value for each pixel of each keyframe; and computing final estimates of the motion or depth value for each pixel of each keyframe based on the initial estimates.

3. The process of claim 2, wherein the act of computing the initial estimates for the pixels of a keyframe comprises the acts of,:

identifying one or more images which are adjacent in time or viewpoint to the keyframe and designating each of said images as an neighboring image;

generating a series of candidate motion or depth values for the pixel of the keyframe;

for each candidate motion or depth value,
  computing an indictor for each neighboring image indicative of the difference between a desired characteristic exhibited by a pixel in the neighboring image which corresponds to a pixel of the keyframe and that exhibited by the keyframe's pixel,
  weighting the difference indicator for each neighboring image based on the degree to which the neighboring image will contribute to the estimation of the motion or depth values associated with the pixels of the keyframe to produce a weighted indicator,
  summing the weighted indicators associated with the neighboring images to produce a cost factor;

identifying the lowest overall cost factor for each pixel of the keyframe among those produced with each candidate motion or depth value; and assigning the candidate motion or depth value corresponding to the lowest cost factor as the initial estimate of the motion or depth value for the associated pixel of the keyframe.

4. The process of claim 3, wherein the series of candidate motion or depth values includes zero (0) as a baseline value.

5. The process of claim 3, further comprising the act of aggregating the computed first indicator spatially prior to performing the act of applying a weighting factor to the first indicator.

6. The process of claim 5, wherein the act of aggregating the computed first indicator spatially comprises the act of employing a spatial convolution process.

7. The process of claim 3, further comprising, following the act of assigning the motion or depth value associated with the lowest cost factor as the initial estimate, performing the act of refining the initial estimate for the chosen pixel via a fractional motion or depth estimation process.

8. The process of claim 3, wherein the act of identifying the desired characteristic comprises the act of identifying the intensity exhibited by the matching pixel.

9. The process of claim 3, wherein the act of identifying the desired characteristic comprises the act of identifying the color exhibited by the matching pixel.

10. The process of claim 3, wherein the act of computing the indictor comprises the act of employing a robust penalty function.

11. The process of claim 10, wherein the robust penalty function is based on contaminated Gaussian distribution.

12. The process of claim 10, wherein the robust penalty function is generalized to account for global bias and gain changes between the selected keyframe and the chosen neighboring image.

13. The process of claim 3, wherein the act of generating a series of candidate motion or depth values comprises the act of employing a correlation-style search process.

14. The process of claim 3, further comprising the act of aggregating the computed first indicator spatially prior to performing the act of applying a weighting factor to the first indicator.

15. The process of claim 14, wherein the act of aggregating the computed first indicator spatially comprises the act of employing a spatial convolution process.

16. The process of claim 2, further comprising the act of refining the initial estimate of the motion or depth value for a pixel of a keyframe via a multi-resolution estimation procedure, said multi-resolution estimation procedure comprising the acts of:

creating a multi-resolution pyramid from each image of the 3D scene;

computing an estimate of the motion or depth value for each pixel of a lowest resolution level of each keyframe;

for each keyframe at a next higher resolution level,
  modifying the estimates of the motion or depth values computed for the keyframe at the next lower resolution level to compensate for the increase in resolution in the current keyframe resolution level,
  computing an estimate of the motion or depth value for each pixel of the keyframe at its current resolution level using the modified estimates as initializing values;

repeating the modifying and second computing acts for each keyframe at a prescribed number of next higher resolution levels.

17. The process of claim 16, wherein the last resolution level of the prescribed number of resolution levels corresponds to the highest resolution level of the multi-resolution pyramid for each keyframe.

18. The process of claim 2, further comprising the act of refining the initial estimate of the motion or depth value for a pixel of a keyframe via an iterative procedure, said iterative procedure comprising the acts of:

assigning a number of iterations to be completed to produce the refined estimate of the motion or depth value for the pixel of the keyframe;

for the first iteration,
  computing a new estimate of the motion or depth value associated with the keyframe pixel using the previously computed initial estimate as an initializing value;

for each subsequent iteration, if any, up to the assigned number,
  computing a new estimate of the motion or depth value associated with the keyframe pixel using the estimate of the motion or depth value computed in the last preceding iteration as an initializing value; and assigning the last computed motion or depth value as the refined initial estimate for the pixel of the keyframe.

19. The process of claim 2, wherein the act of computing the final estimates for the pixels of a keyframe comprises the acts of:

identifying one or more images which are adjacent in time or viewpoint to the keyframe and designating each of said images as a neighboring image;

generating a series of candidate motion or depth values for the pixel of the keyframe using the previously computed initial estimate of the motion or depth value for the keyframe pixel as a baseline value;

for each candidate motion or depth value, starting with the previously computed initial estimate of the motion or depth value for the keyframe pixel, computing an indictor for each neighboring image indicative of the difference between a desired characteristic exhibited by a pixel in the neighboring image which corresponds to a pixel of the keyframe and that exhibited by the keyframe's pixel, weighting the difference indicator for each neighboring image based on the degree to which the neighboring image will contribute to the estimation of the motion or depth values associated with the pixels of the keyframe to produce a weighted indicator, summing the weighted indicators associated with the neighboring images to produce a cost factor;

identifying the lowest cost factor for each pixel of the keyframe among those produced with each candidate motion or depth value; and assigning the candidate motion or depth value corresponding to the lowest cost factor as the final estimate of the motion or depth value for the associated pixel of the keyframe.

20. The process of claim 19, further comprising, performing the acts of:

for each neighboring image whose pixels lack a previously estimated motion or depth value, estimating the motion or depth value of a pixel in each of the neighboring images that correspond to a keyframe pixel based on the previously computed estimate of the motion or depth for the keyframe pixel;

determining for each neighboring image whether each keyframe pixel is visible in the neighboring image by comparing the similarity between the motion or depth value previously computed for a keyframe pixel and the motion or depth value associated with the corresponding pixel of the neighboring image, said keyframe pixel being visible in the neighboring image if the compared motion or depth values are similar within a prescribed error threshold; and whenever it is determined that a keyframe pixel is not visible in a neighboring image, employing other keyframe pixels in the vicinity of the pixel of interest for which the motion or depth value is being estimated to derive any pixel characteristic needed in estimating the motion or depth value for the keyframe pixel of interest, rather than using the characteristic actually exhibited by the pixel determined not to be visible.

21. The process of claim 2, wherein the act of computing the final estimates for the pixels of a keyframe comprises the acts of:

identifying one or more images which are adjacent in time or viewpoint to the keyframe and designating each of said images as a neighboring image;

generating a series of candidate motion or depth values for the pixel of the keyframe using the previously computed initial estimate of the motion or depth value for the keyframe pixel as a baseline value;

for each candidate motion or depth value, starting with the previously computed initial estimate of the motion or depth value for the keyframe pixel, for each neighboring image whose pixels lack a previously estimated motion or depth value, estimating the motion or depth value of a pixel in each of the neighboring images that correspond to a keyframe pixel based on the previously computed estimate of the motion or depth for the keyframe pixel, computing a first indictor for each neighboring image indicative of the difference between a desired characteristic exhibited by a pixel in the neighboring image which corresponds to a pixel of the keyframe and that exhibited by the keyframe's pixel, computing a second indictor for each neighboring image indicative of the difference between the motion or depth value previously estimated for a keyframe pixel and that of its corresponding pixel in the neighboring image, adding the first indicator and the second indicator associated with each keyframe pixel, respectively, for each neighboring image to produce a combined indicator, weighting the combined indicator for each neighboring image based on the degree to which the neighboring image will contribute to the estimation of the motion or depth values associated with the pixels of the keyframe to produce a combined weighted indicator, summing the combined weighted indicators associated with the neighboring images to produce a cost factor, identifying the lowest cost factor for each pixel of the keyframe among those produced using each candidate motion or depth value; and assigning the candidate motion or depth value corresponding to the lowest cost factor as the final estimate of the motion or depth value for the associated keyframe pixel.

22. The process of claim 21, further comprising, performing the acts of:

determining for each neighboring image whether each keyframe pixel is visible in the neighboring image by comparing the similarity between the motion or depth value previously computed for a keyframe pixel and the motion or depth value associated with the corresponding pixel of the neighboring image, said keyframe pixel being visible in the neighboring image if the compared motion or depth values are similar within a prescribed error threshold; and whenever it is determined that a keyframe pixel is not visible in a neighboring image, employing other keyframe pixels in the vicinity of the pixel of interest for which the motion or depth value is being estimated to derive any pixel characteristic needed in estimating the motion or depth value for the keyframe pixel of interest, rather than using the characteristic actually exhibited by the pixel determined not to be visible.

23. The process of claim 2, wherein the act of computing the final estimates for the pixels of a keyframe comprises the acts of:

identifying one or more images which are adjacent in time or viewpoint to the keyframe and designating each of said images as a neighboring image;

identifying a group of pixels in the keyframe which are physically adjacent to the pixel for which the final estimate is being computed and designating said pixels as neighboring pixels;

generating a series of candidate motion or depth values for the pixel of the keyframe using the previously computed initial estimate of the motion or depth value for the keyframe pixel as a baseline value;

for each candidate motion or depth value, starting with the previously computed initial estimate of the motion or depth value for the keyframe pixel,
 for each neighboring image whose pixels lack a previously estimated motion or depth value, estimating the motion or depth value of a pixel in each of the neighboring images that correspond to a keyframe pixel based on the previously computed estimate of the motion or depth for the keyframe pixel,
 computing a first indictor for each neighboring image indicative of the difference between a desired characteristic exhibited by a pixel in the neighboring image which corresponds to a pixel of the keyframe and that exhibited by the keyframe's pixel,
 computing a second indictor for each neighboring image indicative of the difference between the motion or depth value previously estimated for a keyframe pixel and that of its corresponding pixel in the neighboring image,
 adding the first indicator and the second indicator associated with each keyframe pixel, respectively, for each neighboring image to produce a combined indicator, weighting the combined indicator for each neighboring image based on the degree to which the neighboring image will contribute to the estimation of the motion or depth values associated with the pixels of the keyframe to produce a combined weighted indicator,
 summing the combined weighted indicators associated with the neighboring images to produce a first cost factor,
 computing a third indictor for each neighboring pixel indicative of the difference between the candidate motion or depth value currently associated with a pixel of the keyframe for which the final estimate is being computed and a previously assigned motion or depth value of the neighboring pixel,
 summing the computed third indicators associated with the neighboring pixels to produce a second cost factor,
 adding the first and second cost factors for each pixel of the keyframe, respectively, to produce a combined cost for each keyframe pixel;
 identifying the lowest combined cost for each pixel of the keyframe among those produced using each candidate motion or depth value; and
 assigning the candidate motion or depth value corresponding to the lowest cost as the final estimate of the motion or depth value for the associated keyframe pixel.

24. The process of claim 23 further comprising, performing the acts of:
 determining for each neighboring image whether each keyframe pixel is visible in the neighboring image by comparing the similarity between the motion or depth value previously computed for a keyframe pixel and the motion or depth value associated with the corresponding pixel of the neighboring image, said keyframe pixel being visible in the neighboring image if the compared motion or depth values are similar within a prescribed error threshold; and
 whenever it is determined that a keyframe pixel is not visible in a neighboring image, employing other keyframe pixels in the vicinity of the pixel of interest for which the motion or depth value is being estimated to derive any pixel characteristic needed in estimating the motion or depth value for the keyframe pixel of interest, rather than using the characteristic actually exhibited by the pixel determined not to be visible.

25. The process of claim 23, wherein the act of identifying the desired characteristic comprises the act of identifying the intensity exhibited by the matching pixel.

26. The process of claim 23, wherein the act of identifying the desired characteristic comprises the act of identifying the color exhibited by the matching pixel.

27. The process of claim 23, wherein the act of computing the first indictor comprises the act of employing a robust penalty function.

28. The process of claim 27, wherein the robust penalty function is based on contaminated Gaussian distribution.

29. The process of claim 27, wherein the robust penalty function is generalized to account for global bias and gain changes between the selected keyframe and the chosen neighboring image.

30. The process of claim 23, wherein the act of generating a series of candidate motion or depth values comprises the act of employing a correlation style search process.

31. The process of claim 23, further comprising the act of aggregating the combined indicator spatially prior to performing the act of weighting the combined indicator.

32. The process of claim 31, wherein the act of aggregating the computed first indicator spatially comprises the act of employing a spatial convolution process.

33. The process of claim 23, further comprising, following the act of assigning the candidate motion or depth value corresponding to the lowest cost as the final estimate, performing the act of refining the final estimate for the keyframe pixel via a fractional motion or depth estimation process.

34. The process of claim 2, further comprising the act of refining the final estimate of the motion or depth value for a pixel of a keyframe via a multi-resolution estimation procedure, said multi-resolution estimation procedure comprising the acts of:
 creating a multi-resolution pyramid from each image of the 3D scene;
 computing an estimate of the motion or depth value for each pixel of a lowest resolution level of each keyframe;
 for each keyframe at a next higher resolution level,
  modifying the estimates of the motion or depth values computed for the keyframe at the next lower resolution level to compensate for the increase in resolution in the current keyframe resolution level,
  computing an estimate of the motion or depth value for each pixel of the keyframe at its current resolution level using the modified estimates as initializing values;
 repeating the modifying and second computing acts for each keyframe at a prescribed number of next higher resolution levels.

35. The process of claim 34, wherein the last resolution level of the prescribed number of resolution levels corresponds to the highest resolution level of the multi-resolution pyramid for each keyframe.

36. The process of claim 2, further comprising the act of refining the final estimate of the motion or depth value for a pixel of a keyframe via an iterative procedure, said iterative procedure comprising the acts of:
 assigning a number of iterations to be completed to produce the refined estimate of the motion or depth value for the pixel of the keyframe;

for the first iteration,
   computing a new estimate of the motion or depth value associated with the keyframe pixel using the previously computed initial estimate as an initializing value;
for each subsequent iteration, if any, up to the assigned number,
   computing a new estimate of the motion or depth value associated with the keyframe pixel using the estimate of the motion or depth value computed in the last preceding iteration as an initializing value; and
assigning the last computed motion or depth value as the refined final estimate for the pixel of the keyframe.

37. A system for estimating motion or depth values for multiple images of a 3D scene, comprising:
   a general purpose computing device; and
   a computer program comprising program modules executable by the computing device, wherein the computing device is directed by the program modules of the computer program to,
      input the multiple images of the 3D scene,
      select at least two images from the multiple images, hereafter referred to as keyframes,
      create a motion or depth map for each keyframe by estimating a motion or depth value for each pixel of each keyframe using motion or depth information from images neighboring the keyframe in viewpoint or time.

38. The system of claim 37, wherein the estimating program module comprises sub-modules for:
   computing initial estimates of the motion or depth value for each pixel of each keyframe; and
   computing final estimates of the motion or depth value for each pixel of each keyframe based on the initial estimates.

39. The system of claim 38, wherein the sub-module for computing the initial estimates for the pixels of a keyframe comprises sub-modules for:
   (a) selecting one of the keyframes;
   (b) generating a series of candidate motion or depth values for each pixel of the selected keyframe,
   (c) identifying one or more images which are adjacent in time or viewpoint to the selected keyframe and designating each of said images as a neighboring image;
   (d) choosing one of the candidate motion or depth values;
   (e) choosing one of the neighboring images;
   (f) for each pixel of the selected keyframe, computing the location of a matching pixel in the chosen neighboring image which corresponds to a pixel of the selected image;
   (g) identifying a desired characteristic exhibited by each matching pixel;
   (h) for each pixel of the selected keyframe, computing a first indictor indicative of the difference between said desired characteristic exhibited by a matching pixel and that exhibited by the corresponding pixel of the selected keyframe;
   (i) for each pixel of the selected keyframe, applying a weighting factor to the first indicator to produce a weighted first indicator, said weighting factor dictating the degree to which the chosen neighboring image will contribute to the estimation of the motion or depth values associated with the pixels of the selected keyframe;
   (j) repeating sub-modules (e) through (i) for each of the remaining neighboring images;
   (k) for each pixel of the selected keyframe, summing the weighted first indicators associated with the neighboring images to produce a first cost factor for each keyframe pixel;
   (l) repeating sub-modules (d) through (k) for each of the remaining candidate motion or depth values;
   (m) identifying the lowest first cost factor for each pixel of the selected keyframe; and
   (n) respectively assigning the motion or depth value associated with each lowest first cost factor as the initial estimate of the motion or depth value for the associated pixel of the selected keyframe.

40. The system of claim 39, wherein the series of candidate motion or depth values includes zero (0) as a baseline value.

41. The system of claim 39, further comprising a sub-module for aggregating the computed first indicator spatially prior to performing the sub-module (j).

42. The system of claim 41, wherein the sub-module for aggregating the computed first indicator spatially comprises the sub-module for employing a spatial convolution process.

43. The system of claim 39, further comprising, following sub-module (n), performing a sub-module for refining the initial estimate of the motion or depth value for the chosen pixel via a fractional motion or depth estimation process.

44. The system of claim 39, wherein the sub-module for identifying the desired characteristic comprises a sub-module for identifying the intensity exhibited by the matching pixel.

45. The system of claim 39, wherein the sub-module for identifying the desired characteristic comprises a sub-module for identifying the color exhibited by the matching pixel.

46. The system of claim 39, wherein the sub-module for computing the first indictor comprises a sub-module for employing a robust penalty function.

47. The system of claim 46, wherein the robust penalty function is based on contaminated Gaussian distribution.

48. The system of claim 46, wherein the robust penalty function is generalized to account for global bias and gain changes between the selected keyframe and the chosen neighboring image.

49. The system of claim 39, wherein the sub-module for generating a series of candidate motion or depth values comprises a sub-module for employing a correlation-style search process.

50. The system of claim 38, further comprising a sub-module for refining the initial estimate of the motion or depth value for a pixel of a keyframe via a multi-resolution estimation procedure, said multi-resolution estimation procedure comprising sub-modules for:
   creating a multi-resolution pyramid from each image of the 3D scene;
   computing an estimate of the motion or depth value for each pixel of a lowest resolution level of each keyframe;
   for each keyframe at a next higher resolution level,
      modifying the estimates of the motion or depth values computed for the keyframe at the next lower resolution level to compensate for the increase in resolution in the current keyframe resolution level,
      computing an estimate of the motion or depth value for each pixel of the keyframe at its current resolution level using the modified estimates as initializing values;
   repeating the modifying and second computing sub-modules each keyframe at a prescribed number of next higher resolution levels.

51. The system of claim 50, wherein the last resolution level of the prescribed number of resolution levels corresponds to the highest resolution level of the multi-resolution pyramid for each keyframe.

52. The system of claim 38, further comprising a sub-module for refining the initial estimate of the motion or depth value for a pixel of a keyframe via an iterative procedure, said iterative procedure comprising sub-modules for:

assigning a number of iterations to be completed to produce the refined estimate of the motion or depth value for the pixel of the keyframe;

for the first iteration,
computing a new estimate of the motion or depth value associated with the keyframe pixel using the previously computed initial estimate as an initializing value;

for each subsequent iteration, if any, up to the assigned number
computing a new estimate of the motion or depth value associated with the keyframe pixel using the estimate of the motion or depth value computed in the last preceding iteration as an initializing value; and assigning the last computed motion or depth value as the refined initial estimate for the pixel of the keyframe.

53. The system of claim 38, wherein the sub-module for computing the final estimates for the pixels of a keyframe comprises sub-modules for:

(a) selecting one of the keyframes;
(b) generating a series of candidate motion or depth values for each pixel of the selected keyframe;
(c) identifying one or more images which are adjacent in time or viewpoint to the selected keyframe and designating each of said images as a neighboring image;
(d) choosing one of the candidate motion or depth values;
(e) choosing one of the neighboring images;
(f) for each pixel of the selected keyframe, computing the location of a matching pixel in the chosen neighboring image which corresponds to a pixel of the selected image;
(g) identifying a desired characteristic exhibited by each matching pixel;
(h) for each pixel of the selected keyframe, computing a first indictor indicative of the difference between said desired characteristic exhibited by a matching pixel and that exhibited by the corresponding pixel of the selected keyframe;
(i) for each pixel of the selected keyframe, applying a weighting factor to the first indicator to produce a weighted first indicator, said weighting factor dictating the degree to which the chosen neighboring image will contribute to the estimation of the motion or depth values associated with the pixels of the selected keyframe;
(j) repeating sub-modules (e) through (i) for each of the remaining neighboring images;
(k) for each pixel of the selected keyframe, summing the weighted first indicators associated with the neighboring images to produce a first cost factor for each keyframe pixel;
(l) repeating sub-modules (d) through (k) for each of the remaining candidate motion or depth values;
(m) identifying the lowest first cost factor for each pixel of the selected keyframe; and
(n) respectively assigning the motion or depth value associated with each lowest first cost factor as the initial estimate of the motion or depth value for the associated pixel of the selected keyframe.

54. The system of claim 53 further comprising, performing sub-modules for:

whenever the selected neighboring image pixels lack a previously estimated motion or depth value, computing the motion or depth value of a pixel in each of the neighboring images that correspond to a pixel of the selected keyframe based on the previously computed estimate of the motion or depth for the chosen pixel;

determining for each neighboring image whether each pixel of the selected keyframe is visible in the neighboring image by comparing the similarity between the motion or depth value previously computed for a keyframe pixel and the motion or depth value associated with the corresponding pixel of the neighboring image, said chosen pixel being visible in the neighboring image if the compared motion or depth values are similar within a prescribed error threshold; and whenever it is determined that a pixel is not visible in a neighboring image, employing other keyframe pixels in the vicinity of the chosen pixel to derive any pixel characteristic needed in estimating the motion or depth value for the keyframe pixel of interest, rather than using the characteristic actually exhibited by the pixel determined not to be visible.

55. The system of claim 38, wherein the sub-module for computing the final estimates for the pixels of a keyframe comprises sub-modules for:

(a) selecting one of the keyframes;
(b) generating a series of candidate motion or depth values for each pixel of the selected keyframe using the previously computed initial estimate of the motion or depth value for each pixel as a baseline value;
(c) identifying one or more images which are adjacent in time or viewpoint to the selected keyframe and designating each of said images as a neighboring image;
(d) choosing one of the candidate motion or depth values starting with the previously computed initial estimate of the motion or depth value for the chosen pixel;
(e) choosing one of the neighboring images;
(f) respectively computing the location of a matching pixel in the chosen neighboring image which corresponds to each pixel of the selected image;
(g) identifying a desired characteristic exhibited by each matching pixel;
(h) whenever the selected neighboring image pixels lack a previously estimated motion or depth value, computing the motion or depth value of a pixel in each of the neighboring images that correspond to a pixel of the selected keyframe based on the previously computed estimate of the motion or depth for the chosen pixel;
(i) for each pixel of the selected keyframe, computing a first indictor indicative of the difference between said desired characteristic exhibited by a matching pixel and that exhibited by the corresponding pixel of the selected keyframe;
(j) for each pixel of the selected keyframe, computing a second indictor indicative of the difference between the motion or depth value previously estimated for a pixel of the selected keyframe and that of its corresponding pixel in the neighboring image;
(k) adding the first indicator and the second indicator associated with each keyframe pixel respectively to produce a combined indicator;

(l) for each pixel of the selected keyframe, applying a weighting factor to the combined indicator to produce a combined weighted indicator, said weighting factor dictating the degree to which the chosen neighboring image will contribute to the estimation of the motion or depth values associated with the pixels of the selected keyframe;

(m) repeating sub-module (e) through (l) for each of the remaining neighboring images;

(n) for each pixel of the selected keyframe, summing the combined weighted indicators associated with the neighboring images to produce a cost factor for each keyframe pixel;

(o) repeating sub-modules (d) through (n) for each of the remaining candidate motion or depth values;

(p) identifying the lowest cost factor for each pixel of the selected keyframe among those produced using each candidate motion or depth value; and (q) respectively assigning the motion or depth value associated with each lowest cost factor as the final estimate of the motion or depth value for the associated pixel of the selected keyframe.

56. The system of claim 55 further comprising, performing sub-modules for:

determining for each neighboring image whether each pixel of the selected keyframe is visible in the neighboring image by comparing the-similarity between the motion or depth value previously computed for a keyframe pixel and the motion or depth value associated with the corresponding pixel of the neighboring image, said chosen pixel being visible in the neighboring image if the compared motion or depth values are similar within a prescribed error threshold; and whenever it is determined that a pixel is not visible in a neighboring image, employing other keyframe pixels in the vicinity of the chosen pixel to derive any pixel characteristic needed in estimating the motion or depth value for the keyframe pixel of interest, rather than using the characteristic actually exhibited by the pixel determined not to be visible.

57. The system of claim 55, wherein the sub-module for identifying the desired characteristic comprises a sub-module for identifying the intensity exhibited by the matching pixel.

58. The system of claim 55, wherein the sub-module for identifying the desired characteristic comprises a sub-module for identifying the color exhibited by the matching pixel.

59. The system of claim 55, wherein the sub-module for computing the first indictor comprises a sub-module for employing a robust penalty function.

60. The system of claim 59, wherein the robust penalty function is based on contaminated Gaussian distribution.

61. The system of claim 59, wherein the robust penalty function is generalized to account for global bias and gain changes between the selected keyframe and the chosen neighboring image.

62. The system of claim 55, wherein the sub-module for generating a series of candidate motion or depth values comprises a sub-module for employing a correlation-style search process.

63. The system of claim 55, further comprising a sub-module for aggregating the combined indicator spatially prior to performing sub-module (m).

64. The system of claim 63, wherein the sub-module for aggregating the computed first indicator spatially comprises a sub-module for employing a spatial convolution process.

65. The system of claim 55, further comprising, following sub-module (s), performing a sub-module for refining the initial estimate of the motion or depth value for the chosen pixel via a fractional motion or depth estimation process.

66. The system of claim 38, further comprising a sub-module for refining the final estimate of the motion or depth value for a pixel of a keyframe via a multi-resolution estimation procedure, said multi-resolution estimation procedure comprising the sub-modules for:

creating a multi-resolution pyramid from each image of the 3D scene;

computing an estimate of the motion or depth value for each pixel of a lowest resolution level of each keyframe;

for each keyframe at a next higher resolution level,
modifying the estimates of the motion or depth values computed for the keyframe at the next lower resolution level to compensate for the increase in resolution in the current keyframe resolution level, computing an estimate of the motion or depth value for each pixel of the keyframe at its current resolution level using the modified estimates as initializing values;

repeating the modifying and second computing sub-modules for each keyframe at a prescribed number of next higher resolution levels.

67. The system of claim 66, wherein the last resolution level of the prescribed number of resolution levels corresponds to the highest resolution level of the multi-resolution pyramid for each keyframe.

68. The system of claim 38, further comprising a sub-module for refining the final estimate of the motion or depth value for a pixel of a keyframe via an iterative procedure, said iterative procedure comprising sub-modules for:

assigning a number of iterations to be completed to produce the refined estimate of the motion or depth value for the pixel of the keyframe;

for the first iteration,
computing a new estimate of the motion or depth value associated with the keyframe pixel using the previously computed initial estimate as an initializing value;

for each subsequent iteration, if any, up to the assigned number,
computing a new estimate of the motion or depth value associated with the keyframe pixel using the estimate of the motion or depth value computed in the last preceding iteration as an initializing value; and assigning the last computed motion or depth value as the refined final estimate for the pixel of the keyframe.

69. The system of claim 38, wherein the sub-module for computing the final estimates for the pixels of a keyframe comprises sub-modules for:

(a) selecting one of the keyframes;

(b) generating a series of candidate motion or depth values for each pixel of the selected keyframe using the previously computed initial estimate of the motion or depth value for each pixel as a baseline value;

(c) identifying one or more images which are adjacent in time or viewpoint to the selected keyframe and designating each of said images as a neighboring image;

(d) choosing one of the candidate motion or depth values starting with the previously computed initial estimate of the motion or depth value for the chosen pixel;

(e) choosing one of the neighboring images;

(f) respectively computing the location of a matching pixel in the chosen neighboring image which corresponds to each pixel of the selected image;

(g) identifying a desired characteristic exhibited by each matching pixel;

(h) whenever the selected neighboring image pixels lack a previously estimated motion or depth value, computing the motion or depth value of a pixel in each of the neighboring images that correspond to a pixel of the selected keyframe based on the previously computed estimate of the motion or depth for the chosen pixel;

(i) for each pixel of the selected keyframe, computing a first indictor indicative of the difference between said desired characteristic exhibited by a matching pixel and that exhibited by the corresponding pixel of the selected keyframe;

(j) for each pixel of the selected keyframe, computing a second indictor indicative of the difference between the motion or depth value previously estimated for a pixel of the selected keyframe and that of its corresponding pixel in the neighboring image;

(k) adding the first indicator and the second indicator associated with each keyframe pixel, respectively, to produce a combined indicator, (l) for each pixel of the selected keyframe, applying a weighting factor to the combined indicator to produce a combined weighted indicator, said weighting factor dictating the degree to which the chosen neighboring image will contribute to the estimation of the motion or depth values associated with the pixels of the selected keyframe;

(m) repeating sub-modules (e) through (l) for each of the remaining neighboring images;

(n) for each pixel of the selected keyframe, summing the combined weighted indicators associated with the neighboring images to produce a first cost factor for each keyframe pixel;

(o) choosing a previously unselected pixel of the selected keyframe;

(p) identifying a group of pixels in the selected keyframe which are physically adjacent to the chosen pixel and designating said pixels as neighboring pixels;

(q) choosing one of the neighboring pixels;

(r) computing a third indictor indicative of the difference between the chosen candidate motion or depth value of the selected keyframe pixel and a previously assigned motion or depth value of the chosen neighboring pixel;

(s) repeating sub-modules (q) and (r) for each of the remaining neighboring pixels;

(t) summing the computed third indicators associated with the neighboring pixels to produce a second cost factor;

(u) adding the second cost factor associated with the chosen pixel of the selected keyframe to the pixel's first cost factor to produce a combined cost;

(v) repeating sub-modules (o) through (u) for each of the remaining pixels of the keyframe image;

(w) repeating sub-modules (d) through (v) for each of the remaining candidate motion or depth values;

(x) identifying the lowest combined cost for each pixel of the selected keyframe among those produced using each candidate motion or depth value; and (y) respectively assigning the motion or depth value associated with each lowest combined cost as the final estimate of the motion or depth value for the associated pixel of the selected keyframe.

70. The system of claim 69 further comprising, performing sub-modules for:

determining for each neighboring image whether each pixel of the selected keyframe is visible in the neighboring image by comparing the similarity between the motion or depth value previously computed for a keyframe pixel and the motion or depth value associated with the corresponding pixel of the neighboring image, said chosen pixel being visible in the neighboring image if the compared motion or depth values are similar within a prescribed error threshold; and whenever it is determined that a pixel is not visible in a neighboring image, employing other keyframe pixels in the vicinity of the chosen pixel to derive any pixel characteristic needed in estimating the motion or depth value for the keyframe pixel of interest, rather than using the characteristic actually exhibited by the pixel determined not to be visible.

71. A computer-readable memory for estimating motion or depth values for multiple images of a 3D scene, comprising:

a computer-readable storage medium; and a computer program comprising program modules stored in the storage medium, wherein the storage medium is so configured by the compute r program that it causes a computer to, input the multiple images of the 3D scene, select at least two images from the multiple images, hereafter referred to as keyframes, create a motion or depth map for each keyframe by estimating a motion or depth value for each pixel of each keyframe using motion or depth information from images neighboring the keyframe in viewpoint or time.

72. The computer-readable memory of claim 71, wherein the estimating program module comprises sub-modules for:

computing initial estimates of the motion or depth value for each pixel of each keyframe; and computing final estimates of the motion or depth value for each pixel of each keyframe based on the initial estimates.

73. The computer-readable memory of claim 72, wherein the sub-module for computing the initial estimates for the pixels of a keyframe comprises sub-modules for:

(a) selecting one of the keyframes;

(b) generating a series of candidate motion or depth values for each pixel of the selected keyframe;

(c) identifying one or more images which are adjacent in time or viewpoint to the selected keyframe and designating each of said images as a neighboring image;

(d) choosing one of the candidate motion or depth values;

(e) choosing one of the neighboring images;

(f) for each pixel of the selected keyframe, computing the location of a matching pixel in the chosen neighboring image which corresponds to a pixel of the selected image;

(g) identifying a desired characteristic exhibited by each matching pixel;

(h) for each pixel of the selected keyframe, computing a first indictor indicative of the difference between said desired characteristic exhibited by a matching pixel and that exhibited by the corresponding pixel of the selected keyframe;

(i) for each pixel of the selected keyframe, applying a weighting factor to the first indicator to produce a weighted first indicator, said weighting factor dictating the degree to which the chosen neighboring image will contribute to the estimation of the motion or depth values associated with the pixels of the selected keyframe;

(j) repeating sub-modules (e) through (i) for each of the remaining neighboring images;

(k) for each pixel of the selected keyframe, summing the weighted first indicators associated with the neighboring images to produce a first cost factor for each keyframe pixel;

(l) repeating sub-modules (d) through (k) for each of the remaining candidate motion or depth values;

(m) identifying the lowest first cost factor for each pixel of the selected keyframe; and (n) respectively assigning the motion or depth value associated with each lowest first cost factor as the initial estimate of the motion or depth value for the associated pixel of the selected keyframe.

74. The computer-readable memory of claim 73, wherein the series of candidate motion or depth values includes zero (0) as a baseline value.

75. The computer-readable memory of claim 73, further comprising a sub-module for aggregating the computed first indicator spatially prior to performing the sub-module (j).

76. The computer-readable memory of claim 75, wherein the sub-module for aggregating the computed first indicator spatially comprises the sub-module for employing a spatial convolution process.

77. The computer-readable memory of claim 73, further comprising, following sub-module (p), performing a sub-module for refining the initial estimate of the motion or depth value for the chosen pixel via a fractional motion or depth estimation process.

78. The computer-readable memory of claim 73, wherein the sub-module for identifying the desired characteristic comprises a sub-module for identifying the intensity exhibited by the matching pixel.

79. The computer-readable memory of claim 73, wherein the sub-module for identifying the desired characteristic comprises a sub-module for identifying the color exhibited by the matching pixel.

80. The computer-readable memory of claim 73, wherein the sub-module for computing the first indictor comprises a sub-module for employing a robust penalty function.

81. The computer-readable memory of claim 80, wherein the robust penalty function is based on contaminated Gaussian distribution.

82. The computer-readable memory of claim 80, wherein the robust penalty function is generalized to account for global bias and gain changes between the selected keyframe and the chosen neighboring image.

83. The computer-readable memory of claim 73, wherein the sub-module for generating a series of candidate motion or depth values comprises a sub-module for employing a correlation-style search process.

84. The computer-readable memory of claim 72, further comprising a sub-module for refining the initial estimate of the motion or depth value for a pixel of a keyframe via a multi-resolution estimation procedure, said multi-resolution estimation procedure comprising sub-modules for:

creating a multi-resolution pyramid from each image of the 3D scene;

computing an estimate of the motion or depth value for each pixel of a lowest resolution level of each keyframe;

for each keyframe at a next higher resolution level,
modifying the estimates of the motion or depth values computed for the keyframe at the next lower resolution level to compensate for the increase in resolution in the current keyframe resolution level,
computing an estimate of the motion or depth value for each pixel of the keyframe at its current resolution level using the modified estimates as initializing values;

repeating the modifying and second computing sub-modules each keyframe at a prescribed number of next higher resolution levels.

85. The computer-readable memory of claim 84, wherein the last resolution level of the prescribed number of resolution levels corresponds to the highest resolution level of the multi-resolution pyramid for each keyframe.

86. The computer-readable memory of claim 72, further comprising a sub-module for refining the initial estimate of the motion or depth value for a pixel of a keyframe via an iterative procedure, said iterative procedure comprising sub-modules for:

assigning a number of iterations to be completed to produce the refined estimate of the motion or depth value for the pixel of the keyframe;

for the first iteration,
computing a new estimate of the motion or depth value associated with the keyframe pixel using the previously computed initial estimate as an initializing value;

for each subsequent iteration, if any, up to the assigned number,
computing a new estimate of the motion or depth value associated with the keyframe pixel using the estimate of the motion or depth value computed in the last preceding iteration as an initializing value; and assigning the last computed motion or depth value as the refined initial estimate for the pixel of the keyframe.

87. The computer-readable memory of claim 72, wherein the sub-module for computing the final estimates for the pixels of a keyframe comprises sub-modules for:

(a) selecting one of the keyframes;

(b) generating a series of candidate motion or depth values for each pixel of the selected keyframe;

(c) identifying one or more images which are adjacent in time or viewpoint to the selected keyframe and designating each of said images as a neighboring image;

(d) choosing one of the candidate motion or depth values;

(e) choosing one of the neighboring images;

(f) for each pixel of the selected keyframe, computing the location of a matching pixel in the chosen neighboring image which corresponds to a pixel of the selected image;

(g) identifying a desired characteristic exhibited by each matching pixel;

(h) for each pixel of the selected keyframe, computing a first indictor indicative of the difference between said desired characteristic exhibited by a matching pixel and that exhibited by the corresponding pixel of the selected keyframe;

(i) for each pixel of the selected keyframe, applying a weighting factor to the first indicator to produce a weighted first indicator, said weighting factor dictating the degree to which the chosen neighboring image will contribute to the estimation of the motion or depth values associated with the pixels of the selected keyframe;

(j) repeating sub-modules (e) through (i) for each of the remaining neighboring images;

(k) for each pixel of the selected keyframe, summing the weighted first indicators associated with the neighboring images to produce a first cost factor for each keyframe pixel;

(l) repeating sub-modules (d) through (k) for each of the remaining candidate motion or depth values;

(m) identifying the lowest first cost factor for each pixel of the selected keyframe; and (n) respectively assigning the motion or depth value associated with each lowest first cost factor as the initial estimate of the motion or depth value for the associated pixel of the selected keyframe.

88. The computer-readable memory of claim 87 further comprising, performing sub-modules for:

whenever the selected neighboring image pixels lack a previously estimated motion or depth value, estimating the motion or depth value of a pixel in each of the neighboring images that correspond to a pixel of the selected keyframe based on the previously computed estimate of the motion or depth for the chosen pixel;

determining for each neighboring image whether each pixel of the selected keyframe is visible in the neighboring image by comparing the similarity between the motion or depth value previously computed for a keyframe pixel and the motion or depth value associated with the corresponding pixel of the neighboring image, said chosen pixel being visible in the neighboring image if the compared motion or depth values are similar within a prescribed error threshold; and whenever it is determined that a pixel is not visible in a neighboring image, employing other keyframe pixels in the vicinity of the chosen pixel to derive any pixel characteristic needed in estimating the motion or depth value for the keyframe pixel of interest, rather than using the characteristic actually exhibited by the pixel determined not to be visible.

89. The computer-readable memory of claim 87, wherein the sub-module for identifying the desired characteristic comprises a sub-module for identifying the intensity exhibited by the matching pixel.

90. The computer-readable memory of claim 87, wherein the sub-module for identifying the desired characteristic comprises a sub-module for identifying the color exhibited by the matching pixel.

91. The computer-readable memory of claim 87, wherein the sub-module for computing the first indictor comprises a sub-module for employing a robust penalty function.

92. The computer-readable memory of claim 91, wherein the robust penalty function is based on contaminated Gaussian distribution.

93. The computer-readable memory of claim 91, wherein the robust penalty function is generalized to account for global bias and gain changes between the selected keyframe and the chosen neighboring image.

94. The computer-readable memory of claim 87, wherein the sub-module for generating a series of candidate motion or depth values comprises a sub-module for employing a correlation-style search process.

95. The computer-readable memory of claim 87, further comprising a sub-module for aggregating the combined indicator spatially prior to performing sub-module (j).

96. The computer-readable memory of claim 95, wherein the sub-module for aggregating the computed first indicator spatially comprises a sub-module for employing a spatial convolution process.

97. The computer-readable memory of claim 87, further comprising, following sub-module (n), performing a sub-module for refining the final estimate of the motion or depth value for the chosen pixel via a fractional motion or depth estimation process.

98. The computer-readable memory of claim 72, further comprising a sub-module for refining the final estimate of the motion or depth value for a pixel of a keyframe via a multi-resolution estimation procedure, said multi-resolution estimation procedure comprising the sub-modules for:

creating a multi-resolution pyramid from each image of the 3D scene;

computing an estimate of the motion or depth value for each pixel of a lowest resolution level of each keyframe;

for each keyframe at a next higher resolution level,
modifying the estimates of the motion or depth values computed for the keyframe at the next lower resolution level to compensate for the increase in resolution in the current keyframe resolution level,
computing an estimate of the motion or depth value for each pixel of the keyframe at its current resolution level using the modified estimates as initializing values;

repeating the modifying and second computing sub-modules for each keyframe at a prescribed number of next higher resolution levels.

99. The computer-readable memory of claim 98, wherein the last resolution level of the prescribed number of resolution levels corresponds to the highest resolution level of the multi-resolution pyramid for each keyframe.

100. The computer-readable memory of claim 72, further comprising a sub-module for refining the final estimate of the motion or depth value for a pixel of a keyframe via an iterative procedure, said iterative procedure comprising sub-modules for:

assigning a number of iterations to be completed to produce the refined estimate of the motion or depth value for the pixel of the keyframe;

for the first iteration,
computing a new estimate of the motion or depth value associated with the keyframe pixel using the previously computed initial estimate as an initializing value;

for each subsequent iteration, if any, up to the assigned number,
computing a new estimate of the motion or depth value associated with the keyframe pixel using the estimate of the motion or depth value computed in the last preceding iteration as an initializing value; and assigning the last computed motion or depth value as the refined final estimate for the pixel of the keyframe.

101. The computer-readable memory of claim 72, wherein the sub-module for computing the final estimates for the pixels of a keyframe comprises sub-modules for:

(a) selecting one of the keyframes;

(b) generating a series of candidate motion or depth values for each pixel of the selected keyframe using the previously computed initial estimate of the motion or depth value for each pixel as a baseline value;

(c) identifying one or more images which are adjacent in time or viewpoint to the selected keyframe and designating each of said images as a neighboring image;

(d) choosing one of the candidate motion or depth values starting with the previously computed initial estimate of the motion or depth value for the chosen pixel;

(e) choosing one of the neighboring images;
(f) respectively computing the location of a matching pixel in the chosen neighboring image which corresponds to each pixel of the selected image;
(g) identifying a desired characteristic exhibited by each matching pixel;
(h) whenever the selected neighboring image pixels lack a previously estimated motion or depth value, computing the motion or depth value of a pixel in each of the neighboring images that correspond to a pixel of the selected keyframe based on the previously computed estimate of the motion or depth for the chosen pixel;
(i) for each pixel of the selected keyframe, computing a first indictor indicative of the difference between said desired characteristic exhibited by a matching pixel and that exhibited by the corresponding pixel of the selected keyframe;
(j) for each pixel of the selected keyframe, computing a second indictor indicative of the difference between the motion or depth value previously estimated for a pixel of the selected keyframe and that of its corresponding pixel in the neighboring image;
(k) adding the first indicator and the second indicator associated with each keyframe pixel respectively to produce a combined indicator;
(l) for each pixel of the selected keyframe, applying a weighting factor to the combined indicator to produce a combined weighted indicator, said weighting factor dictating the degree to which the chosen neighboring image will contribute to the estimation of the motion or depth values associated with the pixels of the selected keyframe;
(m) repeating sub-module (e) through (l) for each of the remaining neighboring images;
(n) for each pixel of the selected keyframe, summing the combined weighted indicators associated with the neighboring images to produce a cost factor for each keyframe pixel;
(o) repeating sub-modules (d) through (n) for each of the remaining candidate motion or depth values;
(p) identifying the lowest cost factor for each pixel of the selected keyframe among those produced using each candidate motion or depth value; and
(q) respectively assigning the motion or depth value associated with each lowest cost factor as the final estimate of the motion or depth value for the associated pixel of the selected keyframe.

102. The computer-readable memory of claim 101 further comprising, performing sub-modules for:
determining for each neighboring image whether each pixel of the selected keyframe is visible in the neighboring image by comparing the similarity between the motion or depth value previously computed for a keyframe pixel and the motion or depth value associated with the corresponding pixel of the neighboring image, said chosen pixel being visible in the neighboring image if the compared motion or depth values are similar within a prescribed error threshold; and
whenever it is determined that a pixel is not visible in a neighboring image, employing other keyframe pixels in the vicinity of the chosen pixel to derive any pixel characteristic needed in estimating the motion or depth value for the keyframe pixel of interest, rather than using the characteristic actually exhibited by the pixel determined not to be visible.

103. The computer-readable memory of claim 72, wherein the sub-module for computing the final estimates for the pixels of a keyframe comprises sub-modules for:
(a) selecting one of the keyframes;
(b) generating a series of candidate motion or depth values for each pixel of the selected keyframe using the previously computed initial estimate of the motion or depth value for each pixel as a baseline value;
(c) identifying one or more images which are adjacent in time or viewpoint to the selected keyframe and designating each of said images as a neighboring image;
(d) choosing one of the candidate motion or depth values starting with the previously computed initial estimate of the motion or depth value for the chosen pixel;
(e) choosing one of the neighboring images;
(f) respectively computing the location of a matching pixel in the chosen neighboring image which corresponds to each pixel of the selected image;
(g) identifying a desired characteristic exhibited by each matching pixel;
(h) whenever the selected neighboring image pixels lack a previously estimated motion or depth value, computing the motion or depth value of a pixel in each of the neighboring images that correspond to a pixel of the selected keyframe based on the previously computed estimate of the motion or depth for the chosen pixel;
(i) for each pixel of the selected keyframe, computing a first indictor indicative of the difference between said desired characteristic exhibited by a matching pixel and that exhibited by the corresponding pixel of the selected keyframe;
(j) for each pixel of the selected keyframe, computing a second indictor indicative of the difference between the motion or depth value previously estimated for a pixel of the selected keyframe and that of its corresponding pixel in the neighboring image;
(k) adding the first indicator and the second indicator associated with each keyframe pixel, respectively, to produce a combined indicator,
(l) for each pixel of the selected keyframe, applying a weighting factor to the combined indicator to produce a combined weighted indicator, said weighting factor dictating the degree to which the chosen neighboring image will contribute to the estimation of the motion or depth values associated with the pixels of the selected keyframe;
(m) repeating sub-modules (e) through (l) for each of the remaining neighboring images;
(n) for each pixel of the selected keyframe, summing the combined weighted indicators associated with the neighboring images to produce a first cost factor for each keyframe pixel;
(o) choosing a previously unselected pixel of the selected keyframe;
(p) identifying a group of pixels in the selected keyframe which are physically adjacent to the chosen pixel and designating said pixels as neighboring pixels;
(q) choosing one of the neighboring pixels;
(r) computing a third indictor indicative of the difference between the chosen candidate motion or depth value of the selected keyframe pixel and a previously assigned motion or depth value of the chosen neighboring pixel;
(s) repeating sub-modules (q) and (r) for each of the remaining neighboring pixels;

(t) summing the computed third indicators associated with the neighboring pixels to produce a second cost factor;

(u) adding the second cost factor associated with the chosen pixel of the selected keyframe to the pixel's first cost factor to produce a combined cost;

(v) repeating sub-modules (o) through (u) for each of the remaining pixels of the keyframe image;

(w) repeating sub-modules (d) through (v) for each of the remaining candidate motion or depth values;

(x) identifying the lowest combined cost for each pixel of the selected keyframe among those produced using each candidate motion or depth value; and (y) respectively assigning the motion or depth value associated with each lowest combined cost as the final estimate of the motion or depth value for the associated pixel of the selected keyframe.

104. The computer-readable memory of claim 103 further comprising, performing sub-modules for:

determining for each neighboring image whether each pixel of the selected keyframe is visible in the neighboring image by comparing the similarity between the motion or depth value previously computed for a keyframe pixel and the motion or depth value associated with the corresponding pixel of the neighboring image, said chosen pixel being visible in the neighboring image if the compared motion or depth values are similar within a prescribed error threshold; and whenever it is determined that a pixel is not visible in a neighboring image, employing other keyframe pixels in the vicinity of the chosen pixel to derive any pixel characteristic needed in estimating the motion or depth value for the keyframe pixel of interest, rather than using the characteristic actually exhibited by the pixel determined not to be visible.

105. A computer-implemented process for estimating motion or depth values for multiple images of a 3D scene, comprising using a computer to perform the following acts:

inputting the multiple images of a the 3D scene;

selecting at least two images from the multiple images, hereafter referred to as keyframes;

estimating a motion or depth value for each pixel of each keyframe by determining which values produce the minimum cost based on a three-part cost function comprising a pixel intensity compatibility term which characterizes the difference between the intensity exhibited by a pixel of a keyframe and that of a corresponding pixel in neighboring images, a motion or depth value compatibility term which characterizes the difference between the motion or depth estimate for a pixel of a keyframe and that of a corresponding pixel in neighboring images, and a flow smoothness term which characterizes the difference between the motion or depth estimate for a pixel of a keyframe and that of neighboring pixels in the same keyframe.

* * * * *

UNITED STATES PATENT AND TRADEMARK OFFICE
CERTIFICATE OF CORRECTION

PATENT NO. : 6,487,304 B1
DATED : November 26, 2002
INVENTOR(S) : Richard Szeliski It is certified that error appears in the above-identified patent and that said Letters Patent is hereby corrected as shown below:

Column 1,
Line 40, ($\leftrightharpoons$) should be changed to ($\Rightarrow$)

Column 7,
Line 6, "nomography" should be changed to -- homography --
Line 7, "$d_s(x_s,)$" should be changed to -- $d_s(x_s)$ --
Line 10, "us" should be changed to "$\mathbf{u}_s$"
Line 35, equation should appear as follows:
$$p(x; \sigma, \epsilon) = Z^{-1}[(1-\epsilon)\exp(-x^2/(2\sigma^2)) + \epsilon]$$

Line 37, "$\Omega$" should be changed to -- $\sigma$ --
Line 58, equation should appear as follows:
$$C = C_I + C_T + C_s$$

Line 60, "$C_I$," should be changed to -- $C_I$ --

Column 8,
Line 8, equation should appear as follows:
$$e_{st}(\mathbf{x}_s) = \rho_I(I_s(\mathbf{x}_s) - \gamma_{st} I_t(\mathbf{x}_t) - \beta_{st}; \sigma_I^{-2}, \epsilon_I)$$

Line 24, equation should appear as follows:
$$c_{st}(\mathbf{X}_s) = \rho_T(|\mathbf{u}_s(\mathbf{X}_s) - \mathbf{u}_t(\mathbf{X}_t)|; \sigma_T^{-2}, \epsilon_T)$$

Line 46, equation should appear as follows:
$$\epsilon_S(\mathbf{x}, \mathbf{x}') = \psi(|I_s(\mathbf{x}) - I_s(\mathbf{x}')|)$$

Line 60, "probabilitypd" should be changed to -- probability $p_D$ --

Column 9,
Line 24, "$d_s(\mathbf{x}_s) - d_s(\mathbf{x}_t)$" should be changed to -- $d_t(\mathbf{x}_s) - d_s(\mathbf{x}_t)$ --
Line 36, "$\mathbf{x}_t \in I_{t'}$" should be changed to -- $\mathbf{x}_t \notin I_{t'}$ --

Column 11,
Line 56, "i —N ... N, j = -N ... N" should be changed to -- i = -N ... N, j = -N ... N --

Column 14,
Line 54, "$\rho_T(\mathbf{u}_s(\mathbf{x}_s) - \mathbf{u}_t(\mathbf{x}_t)|)$," should be changed to "$\rho_T(|\mathbf{u}_s(\mathbf{x}_s) - \mathbf{u}_t(\mathbf{x}_t)|)$,"

UNITED STATES PATENT AND TRADEMARK OFFICE
CERTIFICATE OF CORRECTION

PATENT NO.    : 6,487,304 B1
DATED         : November 26, 2002
INVENTOR(S)   : Richard Szeliski It is certified that error appears in the above-identified patent and that said Letters Patent is hereby corrected as shown below:

<u>Column 32,</u>
Line 25, "compute r" should be changed to -- computer --

Signed and Sealed this

Twenty-ninth Day of July, 2003

JAMES E. ROGAN
*Director of the United States Patent and Trademark Office*